US012235899B2

(12) United States Patent
Wantland et al.

(10) Patent No.: US 12,235,899 B2
(45) Date of Patent: Feb. 25, 2025

(54) SENSOR BASED SEMANTIC OBJECT GENERATION

(71) Applicant: Google LLC, Mountain View, CA (US)

(72) Inventors: Tim Wantland, Bellevue, WA (US); Donald A. Barnett, Monroe, WA (US); David Matthew Jones, London, NY (US)

(73) Assignee: GOOGLE LLC, Mountain View, CA (US)

( * ) Notice: Subject to any disclaimer, the term of this patent is extended or adjusted under 35 U.S.C. 154(b) by 673 days.

(21) Appl. No.: 17/394,467

(22) Filed: Aug. 5, 2021

(65) Prior Publication Data

US 2021/0365684 A1    Nov. 25, 2021

Related U.S. Application Data

(63) Continuation of application No. 15/929,776, filed on May 21, 2020, now Pat. No. 11,514,672, which is a
(Continued)

(51) Int. Cl.
*G06F 16/783* (2019.01)
*G06F 40/30* (2020.01)
(Continued)

(52) U.S. Cl.
CPC .......... *G06F 16/7837* (2019.01); *G06F 40/30* (2020.01); *G06F 40/42* (2020.01);
(Continued)

(58) Field of Classification Search
USPC ....................................................... 382/103
See application file for complete search history.

(56) References Cited

U.S. PATENT DOCUMENTS

| 8,422,994 B2 * | 4/2013 | Rhoads | G09G 5/00 |
| | | | 455/411 |
| 8,886,222 B1 * | 11/2014 | Rodriguez | G06Q 10/10 |
| | | | 455/456.1 |

(Continued)

FOREIGN PATENT DOCUMENTS

| CN | 101288077 | 10/2008 |
| CN | 102884779 | 1/2013 |

(Continued)

OTHER PUBLICATIONS

Machine Translated Chinese Search Report Corresponding to Application No. 2018800445054 on Mar. 28, 2021.
(Continued)

*Primary Examiner* — Ishrat I Sherali
(74) *Attorney, Agent, or Firm* — DORITY & MANNING P.A.

(57) ABSTRACT

Provided are methods, systems, and devices for generating semantic objects and an output based on the detection or recognition of the state of an environment that includes objects. State data, based in part on sensor output, can be received from one or more sensors that detect a state of an environment including objects. Based in part on the state data, semantic objects are generated. The semantic objects can correspond to the objects and include a set of attributes. Based in part on the set of attributes of the semantic objects, one or more operating modes, associated with the semantic objects can be determined. Based in part on the one or more operating modes, object outputs associated with the semantic objects can be generated. The object outputs can include one or more visual indications or one or more audio indications.

20 Claims, 16 Drawing Sheets

Related U.S. Application Data continuation of application No. 15/792,393, filed on Oct. 24, 2017, now Pat. No. 10,685,233.

(51) Int. Cl.
  *G06F 40/42* (2020.01)
  *G06N 20/00* (2019.01)
  *G06V 20/20* (2022.01)
  *G06V 30/262* (2022.01)
  *G06F 18/214* (2023.01)

(52) U.S. Cl.
  CPC ............. *G06N 20/00* (2019.01); *G06V 20/20* (2022.01); *G06V 30/274* (2022.01); *G06F 18/214* (2023.01)

(56) References Cited

U.S. PATENT DOCUMENTS

| | | | |
|---|---|---|---|
| 10,043,069 B1* | 8/2018 | Liu | G06V 10/235 |
| 10,388,070 B2* | 8/2019 | Spivack | G06F 3/013 |
| 10,685,233 B2* | 6/2020 | Wantland | G06F 40/42 |
| 11,289,084 B2* | 3/2022 | Wantland | G06V 10/17 |
| 11,514,672 B2* | 11/2022 | Wantland | G06F 40/30 |
| 2009/0249887 A1 | 10/2009 | Gysling | |
| 2011/0098056 A1* | 4/2011 | Rhoads | H04M 1/72403 345/173 |
| 2011/0258057 A1* | 10/2011 | Boncyk | G06F 16/5838 705/26.61 |
| 2012/0224743 A1* | 9/2012 | Rodriguez | G06T 11/60 382/103 |
| 2013/0286046 A1* | 10/2013 | Rodriguez | G06T 3/02 345/633 |
| 2015/0085184 A1 | 3/2015 | Vidal et al. | |
| 2016/0071325 A1* | 3/2016 | Callaghan | G06T 19/006 345/633 |
| 2016/0203124 A1 | 7/2016 | Cuthbert et al. | |
| 2016/0301869 A1 | 10/2016 | Mitsunaga et al. | |
| 2017/0200296 A1 | 7/2017 | Jones et al. | |
| 2017/0286383 A1 | 10/2017 | Koul et al. | |
| 2017/0301203 A1 | 10/2017 | Matsuura | |
| 2017/0344854 A1 | 11/2017 | Behringer et al. | |
| 2018/0011877 A1 | 1/2018 | Boncyk et al. | |
| 2018/0165984 A1 | 6/2018 | Waldron et al. | |
| 2018/0204059 A1 | 7/2018 | Antol et al. | |
| 2019/0035101 A1 | 1/2019 | Kwant et al. | |
| 2019/0286910 A1 | 9/2019 | Zimmerman et al. | |
| 2019/0371077 A1* | 12/2019 | Spivack | G06Q 30/0639 |
| 2020/0242402 A1 | 7/2020 | Jung et al. | |

FOREIGN PATENT DOCUMENTS

| | | |
|---|---|---|
| CN | 103399932 | 11/2013 |
| CN | 103729476 | 4/2014 |
| CN | 105573436 | 5/2016 |
| CN | 105793870 | 7/2016 |

OTHER PUBLICATIONS

Anonymous, "User Manual Indoor HD IP Camera Model: C1", Oct. 7, 2016, https://web.archive.org/web/20161007102833/http://foscam.us/downloads/User%20Manual_C1.pdf, retrieved on Sep. 4, 2018, pp. 53-56.

Anonymous, "MEL Secure Systems | Periscope Camera", Mar. 28, 2017, https://web.archive.org/web/20170328165623/http://www.melsecuresystems.com/redeployablecctv/110-periscope-camera, retrieved on Sep. 4, 2018, 2 pages.

Bai, "Strokelets: A Learned Multi-Scale Mid-Level Representation for Scene Text Recognition", Jun. 2016, IEEE Transactions on Image Processing, vol. 25, No. 6, p. 2789-2802.

International Search Report and Written Opinion for PCT/US2018/041854, mailed on Nov. 26, 2018, 18 pages.

Invitation to Pay Additional Fees for PCTUS2018041854, mailed on Sep. 20, 2018, 16 pages.

\* cited by examiner

SENSOR BASED SEMANTIC OBJECT GENERATION

PRIORITY CLAIM

The present application is a continuation of U.S. application Ser. No. 15/929,776 having a filing date of May 21, 2020 which is a continuation of U.S. application Ser. No. 15/792,393 having a filing date of Oct. 24, 2017, patented as U.S. Pat. No. 10,685,233. Applicant claims priority to and the benefit of each of such applications and incorporate all such applications herein by reference in its entirety.

FIELD

The present disclosure relates generally to generating semantic objects and an output based on the detection or recognition of the state of an environment that includes objects.

BACKGROUND

Object detection systems can capture a variety of information about the objects in an environment, including, for example the appearance of an object. Associating aspects of a detected object (e.g., the appearance of the object) with another piece of information such as the identity of the object can be useful in various applications such as facial recognition in which face detection and recognition can be used to gain access to a device based on whether the recognized face corresponds with an authorized user of the device. However, many existing object detection systems require a great deal of user input and interaction, which can be burdensome. Further, many of the existing object detection systems provide limited functionality or have functionality that receives scant use due to a cumbersome user interface. Accordingly, it would be beneficial if there was a way to more effectively capture, process, and manipulate information associated with the state of an environment.

SUMMARY

Aspects and advantages of embodiments of the present disclosure will be set forth in part in the following description, or may be learned from the description, or may be learned through practice of the embodiments.

One example aspect of the present disclosure is directed to a method for generating semantic objects and an output based on the detection or recognition of the state of an environment that includes objects. The method can include receiving, by a computing system comprising one or more computing devices, state data based in part on sensor output from one or more sensors that detect a state of an environment including one or more objects. The method can also include, generating, by the computing system, based in part on the state data, one or more semantic objects corresponding to the one or more objects. The one or more semantic objects can comprise a set of attributes. The method can include, determining, by the computing system, based in part on the set of attributes of the one or more semantic objects, one or more operating modes associated with the one or more semantic objects. Further, the method can include, generating, by the computing system, based in part on the one or more operating modes, one or more object outputs associated with the one or more semantic objects. The one or more object outputs can comprise one or more visual indications or one or more audio indications.

Another example aspect of the present disclosure is directed to one or more tangible, non-transitory computer-readable media storing computer-readable instructions that when executed by one or more processors cause the one or more processors to perform operations. The operations can include receiving state data based in part on sensor output from one or more sensors that detect a state of an environment including one or more objects. The operations can also include, generating, based in part on the state data, one or more semantic objects corresponding to the one or more objects. The one or more semantic objects can comprise a set of attributes. The operations can include, determining, based in part on the set of attributes of the one or more semantic objects, one or more operating modes associated with the one or more semantic objects. Further, the operations can include, generating, based in part on the one or more operating modes, one or more object outputs associated with the one or more semantic objects. The one or more object outputs can comprise one or more visual indications or one or more audio indications.

Another example aspect of the present disclosure is directed to a computing system comprising one or more processors, and one or more non-transitory computer-readable media storing instructions that when executed by the one or more processors cause the one or more processors to perform operations. The operations can include receiving state data based in part on sensor output from one or more sensors that detect a state of an environment including one or more objects. The operations can also include, generating, based in part on the state data, one or more semantic objects corresponding to the one or more objects. The one or more semantic objects can comprise a set of attributes. The operations can include, determining, based in part on the set of attributes of the one or more semantic objects, one or more operating modes associated with the one or more semantic objects. Further, the operations can include, generating, based in part on the one or more operating modes, one or more object outputs associated with the one or more semantic objects. The one or more object outputs can comprise one or more visual indications or one or more audio indications.

Other example aspects of the present disclosure are directed to other computer-implemented methods, systems, apparatus, tangible, non-transitory computer-readable media, user interfaces, memory devices, and electronic devices for generating semantic objects and an output based on the detection or recognition of the state of an environment that includes objects.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
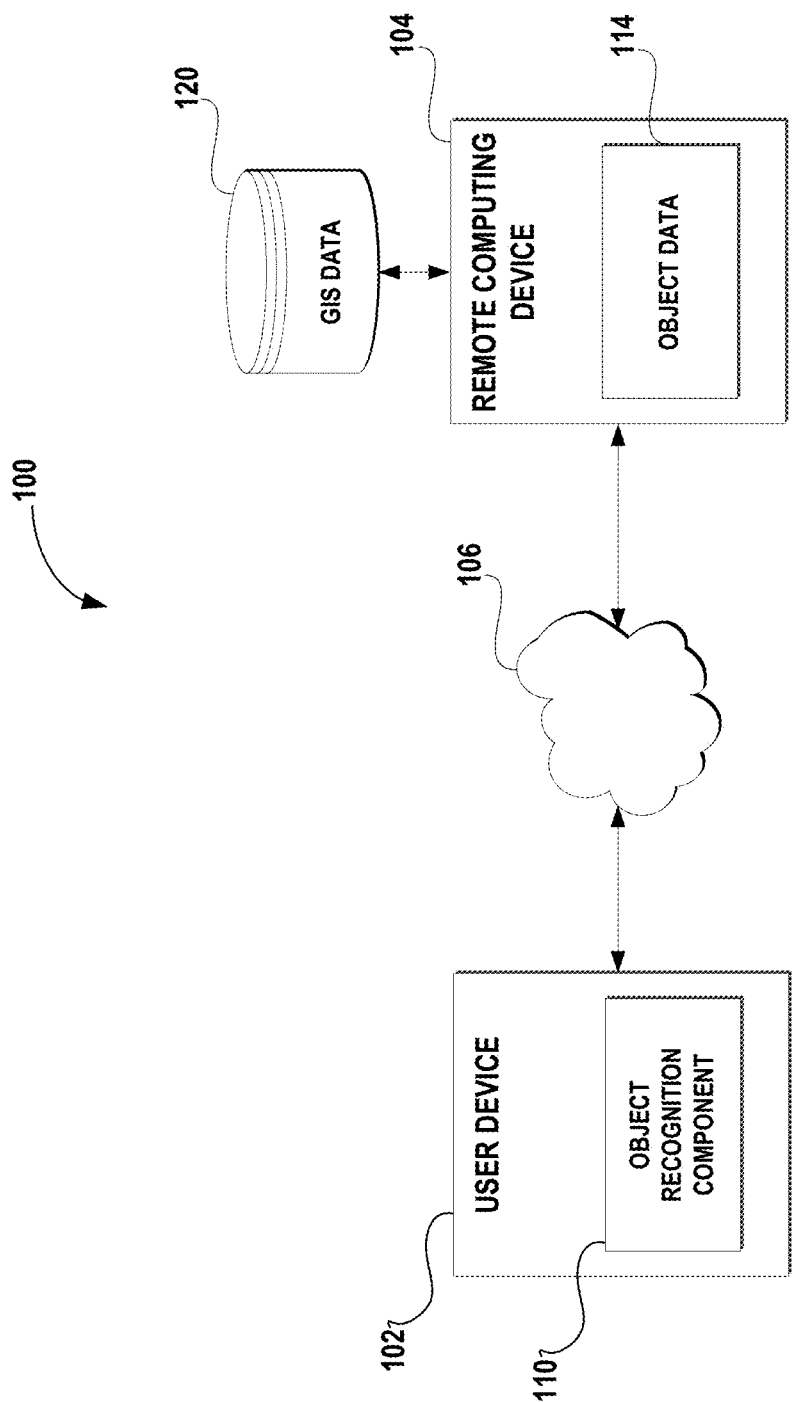
FIG. 1 depicts a diagram of an example system according to example embodiments of the present disclosure.

Example aspects of the present disclosure are directed to detecting, recognizing, and/or identifying objects in an environment, generating semantic objects (e.g., a data structure that is stored in a storage device and that includes one or more attributes associated with one or more objects) based on the objects, and generating an output (e.g., visual indications and/or audio indications) based on the semantic objects. The disclosed technology can receive state data that is associated with the state of an environment (e.g., an outdoor area or an indoor area) and objects in the environment (e.g., buildings, people, vehicles, consumer goods, and/or written materials), generate one or more semantic objects that correspond to the one or more objects (e.g., a handbag semantic object for a physical handbag), determine one or more operating modes associated with the one or more semantic objects (i.e., determine how to process the one or more objects), and generate one or more object outputs that can include one or more visual indications (e.g., one or more images including textual information associated with the one or more objects) or one or more audio indications (e.g., one or more sounds associated with the one or more objects).

As such, the disclosed technology can more effectively recognize objects in an environment and perform various functions based on those objects in a way that is unobtrusive and can in some situations require a minimal level of user input. Further, in some embodiments, by generating one or more semantic objects based on persistent collection of sensor output from real-world objects, the disclosed technology is able to highlight areas of interest that might otherwise go unnoticed. Further, by determining an operational mode to use in gathering and processing sensor inputs, the disclosed technology is able to conserve computational resources and provide information that is more relevant to a user's needs.

By way of example, the disclosed technology can include a computing device that is carried by a user in an environment (e.g., an urban environment) that includes a variety of objects. As the user walks through the environment, the user can hold the computing device in their hand. The computing device can include a camera (e.g., a periscopic camera) that is positioned on a portion of the computing device (e.g., the top edge of the computing device) so that when the longest side of the device is held perpendicular to the user and/or parallel to the ground, the camera can capture one or more images without the user having to aim the camera at objects in the environment. In particular, a camera can be positioned at the top edge of the computing device so that when the computing device is held in a comfortable position for the user (e.g., with the longest side of the device held perpendicular to the user and/or parallel to the ground) the camera has a field of view that is generally in a same direction as the user's vision (e.g., the view in front of the user in the direction the user is facing).

As the user walks through the environment, an electronic device (e.g., a television set) in a store display window can capture the user's interest, and the user can approach the store display window, the camera can capture images of the electronic device, and the computing device can generate a semantic object that is associated with the electronic device. The semantic object associated with the object such as, for example, the electronic device, can include one or more attributes including its type (e.g., television set), size (e.g., screen size of sixty-five inches), make (e.g., the make of the television set manufacturer), and model (e.g., a model number associated with the television set).

Based on the semantic object, the computing device can determine an operating mode to use on the semantic object. The operating mode can indicate a type of processing that the computing device and/or associated computing systems will perform on the semantic object. For example, the computing device can use a text recognition mode when text is detected in an object. In this example, the computing device can determine that the object is merchandise and can access one or more remote data sources and generate queries (e.g., perform a search through an Internet search engine) based on the attributes of the semantic object associated with the object.

The disclosed technology can then provide the user with an output that includes information about the electronic device itself as well as, for example, other stores where the electronic device could be purchased, product ratings associated with the electronic device, and links to websites that offer more information about the electronic device. In this way, the computing device can perform semantic lifting, including sensor-based semantic object generation, to more efficiently process sensor outputs and provide users with the greater convenience that result from the computing device performing tasks that would otherwise be performed by a user.

In some embodiments, the disclosed technology can include a computing system (e.g., a semantic processing system) that can include one or more computing devices (e.g., devices with one or more computer processors and a memory that can store one or more instructions) that can exchange (send and/or receive), process, generate, and/or modify: data including one or more information patterns or structures that can be stored on one or more memory devices (e.g., random access memory) and/or storage devices (e.g., a hard disk drive and/or a solid state drive); and/or one or more signals (e.g., electronic signals). The data and/or one or more signals can be exchanged by the computing system with various other devices including remote computing devices that can provide data associated with, or including, semantic type data associated with the various attributes of objects (e.g., the price of an item of merchandise); and/or one or more sensor devices that can provide sensor output for a geographical area (e.g., camera images from an Internet accessible camera device) that can be used to determine the state of an environment that includes one or more objects.

In some embodiments, the semantic processing system can include a display component (e.g., a liquid crystal display (LCD), an organic light emitting diode (OLED), plasma display panel, electronic ink, and/or a cathode ray tube) that is configured to display one or more images that can include images of an environment that includes one or more objects that are detected by one or more sensors.

The semantic processing system can receive data, including for example, state data that is based in part on sensor output from one or more sensors that detect a state of an environment including one or more objects including physical objects (e.g., buildings, books, and/or baggage). The state data can include information associated with state of the environment and the one or more objects in the environment including the location of the one or more objects, the time of day that the sensor output from the one or more objects is captured, and/or one or more physical characteristics of the objects in the environment (e.g., size, appearance and/or one or more sounds produced by the one or more objects).

In some embodiments, the one or more sensors can include one or more optical sensors (e.g., one or more cameras); one or more periscopic including one or more cameras that have a field of view that exceeds one-hundred and eighty degrees; one or more audio sensors (e.g., one or more microphones); one or more tactile sensors; one or more barometric sensors; one or more gyroscopic sensors; one or more accelerometers including a configuration in which the one or more accelerometers can determine acceleration along three axes (e.g., x axis, y axis, and z axis); one or more humidity sensors including one or more sensors that can detect the level of moisture in the air; one or more electromagnetic sensors; and/or one or more thermal sensors.

Further, the one or more periscopic cameras can be configured or positioned to capture the one or more images including the one or more objects or portions of the one or more objects that are not within a visual plane of the display component. The display component of the semantic computing system can include a visual plane which can include a plane that if it were an optical sensor would capture images within a range of less than one hundred and eighty degrees of the center of the optical sensor (e.g., images perpendicular to the visual plane would not be captured). For example, if the semantic processing device is in the shape of a rectangular cuboid, the display component (e.g., an LCD screen) can be located on one or both of the two sides of the cuboid with the greatest surface area and the one or more periscopic cameras can be located on one or more of the four sides of the cuboid that do not have the greatest surface area.

Further, the semantic processing system can operate on a continuous basis so that detection, identification, and/or recognition of the environment including one or more objects in the environment can be performed on an ongoing basis without input or instruction from a user. The semantic processing system can also provide indications of the one or more objects that are recognized, or of an operating mode (e.g., pathfinding mode, translation mode, and/or object detection mode) as part of an interface (e.g., a graphical user interface that includes a status bar).

In addition, in some embodiments, the recognition of the one or more objects can be performed as a continuous process as a background operation (e.g., on a background thread). Thus, in some embodiments, the semantic processing system can continuously operate in the background to recognize objects within the environment based on sensor data indicative of the environment. In some embodiments, such background operation can include operating to recognize objects even when a camera application is not being executed by the system (e.g., operating in the background even when the user is not operating the camera of the system). The user can be provided with controls to control when the semantic processing system operates to recognize objects and when and what type of data is collected for use by the semantic processing system.

The one or more sensors can be configured to detect the state (e.g., a physical state) of the environment including one or more properties or characteristics of the one or more objects. Further, the semantic processing system can access a chronometer (e.g., a locally based chronometer or a chronometer at a remote location) that can be used to determine a time of day and/or a duration of one or more events including local events (e.g., events that are detectable by the one or more sensors) and non-local events (e.g., events that occur in a location that is not detectable by the one or more sensors). The one or more properties or characteristics of the environment can include a time of day and/or a geographic location (e.g., a latitude and longitude associated with the environment). The one or more properties or characteristics of the one or more objects can include size (e.g., a height, length, and/or width), mass, weight, volume, color, and/or sound associated with the one or more objects).

The semantic processing system can generate, for example based in part on the state data and an object recognition model including a machine learned model, one or more semantic objects corresponding to the one or more objects. The semantic processing system can access a machine learned model (e.g., access a machine learned model that has been stored locally and/or a machine learned model that is stored on a remote computing device) that has been created using a classification dataset including classifier data that includes a set of classified features and a set of classified object labels associated with training data that can be based on, or associated with, a plurality of training objects (e.g., physical objects or simulated objects that are used as training inputs for the machine learned model). The classification dataset can be based in part on inputs from one or more sensors (e.g., cameras and/or microphones) that have been used to generate visual outputs and audio outputs based on the visual inputs and the audio inputs respectively. For example, the machine learned model can be created using a set of cameras and microphones that captured training data including video and audio of an urban area that includes various objects including buildings, streets, vehicles, people, and/or surfaces with text.

In some embodiments, the machine learned model can be based in part on one or more classification techniques comprising linear regression, logistic regression, random forest classification, boosted forest classification, gradient boosting, a neural network, a support vector machine, or a decision tree. Further, the semantic processing system can use various object recognition models or techniques, to generate and/or process the one or more semantic objects, either in combination with the machine learned model or without the machine learned model. For example, the object recognition techniques can receive sensor data associated with one or more sensor outputs and can include one or more genetic algorithms, edge matching, greyscale matching, gradient matching, and/or pose clustering.

The one or more semantic objects can include a set of attributes (e.g., a set of attributes for each of the one or more semantic objects). For example, the set of attributes associated with the one or more semantic objects can include one or more object identities including the identity of the one or more objects associated with the one or more semantic objects (e.g., the designer and style of an article of clothing); one or more object types associated with the type, category, or class of the one or more objects associated with the one or more semantic objects (e.g., a pair of trousers or dress shirt can be associated with a clothing type); an object location including a geographic location associated with the one or more objects associated with the one or more semantic objects (e.g., an address of a building object); a monetary value (e.g., one or more prices associated with an object); an ownership status including the owner of an object (e.g., the owner of real property); and/or a set of physical characteristics (e.g., a size or mass associated with an object).

The semantic processing system can determine, based in part on the set of attributes of the one or more semantic objects, one or more operating modes associated with the one or more semantic objects. The one or more operating modes can determine the way in which the one or more semantic objects are processed and/or used by the semantic processing system. As such, the semantic processing system can selectively dedicate computing resources to a subset of possible operations based on the one or more attributes of the one or more semantic objects (e.g., detecting a poster that includes text can result in a determination that a text recognition mode will be used to process the one or more semantic objects associated with the poster).

The one or more operating modes can include a text recognition mode associated with recognizing textual information in the environment (e.g., recognizing when an object contains text); a location recognition mode associated with recognizing one or more locations in the environment (e.g., locating an entrance to a store); an object recognition mode associated with recognizing the one or more objects in the environment (e.g., recognizing an article of merchandise); and/or an event recognition mode associated with recognizing an occurrence of one or more events in the environment.

The semantic processing system can generate, based in part on the one or more operating modes, one or more object outputs associated with the one or more semantic objects. The one or more object outputs can include one or more outputs via one or more output devices of the semantic processing system (e.g., one or more display devices, audio devices, and/or haptic output devices). The text recognition mode can produce one or more object outputs that include text related output including translations of text that is recognized (e.g., generating English text based on detection and translation of a Chinese text).

In some embodiments, the one or more object outputs can include one or more visual indications (e.g., one or more visual images produced by a display device of the semantic processing system) and/or one or more audio indications (e.g., one or more sounds produced by an audio output device of the semantic processing system). For example, the one or more object outputs can include a translation displayed on a display device, audio indications that include an audio version of a written text (e.g., text to speech), and/or one or more images that are superimposed on camera imagery of an environment.

The semantic processing system can determine, based in part on the set of attributes of the one or more semantic objects, object data that matches the one or more semantic objects. For example, the semantic processing system can match the set of attributes to the object data based on one or more comparisons between portions of the set of attributes and the object data. The object data can include information associated with one or more related objects (e.g., a semantic object for a ring can be associated with other articles of jewelry); one or more remote data sources (e.g., a semantic object for a book can be associated with a website associated with the author of the book); one or more locations; and/or one or more events.

The semantic processing system can access one or more portions of the object data that match the one or more semantic objects. For example, the semantic processing system can access one or more portions of the object data that are stored on one or more remote computing devices. In some embodiments, the one or more object outputs can be based in part on the one or more portions of the object data that match the one or more semantic objects. For example, when the object data includes links to one or more remote computing devices that are associated with the one or more semantic objects, the one or more object outputs can include those links.

The semantic processing system can generate, based in part on the state data or the one or more semantic objects, one or more interface elements associated with the one or more objects. The one or more interface elements can include one or more images (e.g., graphical user interface elements including pictograms and/or text) responsive to one or more inputs (e.g., the one or more interface elements can initiate or trigger one or more operations based on a haptic input and/or an audio input). For example, the one or more interface elements can include a status indicator (e.g., a status bar) that can provide a continuous indication of the status of the one or more objects. In some embodiments recognition of the one or more objects can be performed as a continuous process (e.g., continuous recognition of the one or more objects) so that the one or more objects (e.g., sensor output including visual and/or audio sensor output associated with the one or more objects that) can be detected, identified, and/or recognized in real time and the one or more interface elements including the status indicator can also be updated continuously (e.g., as the one or more objects are recognized in real time). Further, the one or more interface elements can be used to provide navigational instructions (e.g., textual or audio instructions associated with a path to a location) and other information related to the one or more objects in the environment.

Thus, in some embodiments, the semantic processing system can continuously operate in the background to recognize objects. Upon recognizing one or more objects, the semantic processing system can provide a status indicator in a status bar of the user interface. The status indicator can indicate that an object has been recognized and, in some embodiments, can further indicate the type of object that has been recognized. The status indicator in the status bar can provide a non-intrusive visual indication that additional semantic information for an object is available. If interested in receiving the additional semantic information, the user can interact with the status indicator (e.g., by tapping or dragging down) and the additional information (e.g., in the form of additional interface elements) can be displayed within the user interface.

In response to receiving one or more inputs to the one or more interface elements, the semantic processing system can determine one or more remote computing devices that include at least a portion of the object data (e.g., one or more remote computing devices that store some part of the object data). The one or more object outputs can include one or more remote source indications associated with the one or more remote computing devices that comprise at least a portion of the object data (e.g., IP addresses associated with the one or more remote computing devices).

The semantic processing system can determine, based in part on the state data or the one or more semantic objects, the one or more objects that comprise one or more semantic symbols (e.g., one or more graphemes including one or more letters, one or more logograms, one or more syllabic characters and/or one or more pictograms). Based in part on the one or more semantic symbols, the semantic processing system can determine one or more words associated with the one or more semantic symbols (e.g., using dictionary data, certain combinations of the one or more semantic symbols can be associated with words). In some embodiments, the set of attributes of the one or more semantic objects can include the one or more words. For example, the semantic object for a poster with text indicating "Concert at 8:00 p.m. at the Civic center" can include a poster semantic object that includes a set of attributes that includes concert as the value for an event type attribute, 8:00 p.m. as the value for an event time attribute, and Civic center, or a geographic coordinate associated with the Civic center, as the value for the location attribute.

The semantic processing system can determine a detected language that is associated with the one or more semantic symbols. For example, based in part on the combinations of the one or more semantic symbols (e.g., words associated with the one or more semantic symbols), the semantic processing system can determine the language (e.g., a language including English, Russian, Chinese, and/or French) that is associated with the one or more semantic symbols.

The semantic processing system can generate, based in part on translation data, a translated output when the detected language is not associated with a default language (e.g., a language that a user of the semantic processing system has selected as being the language into which the detected language is translated when the detected language is not the same as the default language). The translation data can include one or more semantic symbols in the default language and one or more semantic symbols in the detected language. The semantic processing system can compare the one or more semantic symbols in the detected language to the one or more semantic symbols in the default language to determine and perform an analysis to translate the detected language.

The translated output can include the one or more semantic symbols in the default language that correspond to a portion of the one or more semantic symbols in the detected language (e.g., a multi-language dictionary that includes a listing of one or more words in the default language, each of which is associated with the corresponding word in the detected language). In some embodiments, the one or more object outputs can be based in part on the translated output (e.g., the one or more object outputs can include a visual indication or an audio indication of the translation).

The semantic processing system can receive location data that includes information associated with a current location of the environment and a destination location (e.g., a destination location selected by a user of the semantic processing system). Further, the semantic processing system can determine, based in part on the location data and the state of the one or more objects within a field of view of the one or more sensors, a path from the current location to the destination location (e.g., a path between the current location and the destination location that avoids intervening obstacles).

Further, the semantic processing system can generate one or more directions based in part on the one or more semantic objects and the path from the current location to the destination location. Further, the semantic processing system can determine one or more semantic objects that can be used as landmarks associated with the one or more directions (e.g., a semantic object associated with a lamppost can be used as part of the one or more directions "turn left at the lamp post in front of you"). In some embodiments, the one or more object outputs can be based in part on the one or more directions (e.g., the one or more visual indications or the one or more audio indications can include directions).

In some embodiments, the semantic processing system can determine one or more relevance values corresponding to the one or more semantic objects. The one or more relevance values can be based in part on an extent to which each of the one or more semantic objects is associated with context data. The context data can include various characteristics associated with the environment including data associated with a time of day, a current location (e.g., a latitude and longitude associated with the environment); one or more scheduled events (e.g., one or more events that will occur within a predetermined period of time), one or more user locations, or one or more user preferences (e.g., one or more preferences of a user including food preferences, musical preferences, and/or entertainment preferences). In some embodiments, the one or more object outputs can be based in part on the one or more relevance values that correspond to the one or more semantic objects.

The semantic processing system can modify, based in part on the state data or the semantic data, the one or more visual indications or the one or more audio indications. Modifying the one or more visual indications or the one or more audio indications can include transforming the one or more visual indications into one or more modified audio indications (e.g., generating artificial speech based on text); transforming the one or more audio indications into one or more modified visual indications (e.g., generating text based on audio inputs to a microphone); modifying a size of the one or more visual indications (e.g., increasing the size of text captured by a camera); modifying one or more color characteristics of the one or more visual indications (e.g., generating a highlight around the one or more visual indications); and/or modifying an amplitude of the one or more audio indications (e.g., increasing the volume of one or more audio indications). Such modifications of the one or more visual indications and/or the one or more audio indications can be used to enhance any user's experience and can be particularly useful for individuals with visual or hearing impairments. For example, the semantic processing system can enhance the size and clarity of text that would be otherwise unreadable for an individual with a visual impairment.

One example aspect of the present disclosure is directed to a mobile device that includes a display. In some embodiments, a plane of the display can define a first plane of the mobile device. The mobile device can include a camera arranged to capture one or more images from a direction parallel to the first plane of the mobile device. The mobile device can include a processor configured to receive an image captured by the camera, recognize one or more objects present in the received image, and control an output of the display based on one or more recognized objects in the received image.

In some embodiments, the processor is configured to control the display to output a user-interface element in response to one or more recognized objects. The user-interface element can be displayed over one or more user-interface elements already being displayed by the display. The user-interface element output, in response to one or more recognized objects, can comprise a bar element displayed at a top end of the display when the output of the display has a portrait orientation. In some embodiments, the processor is configured to recognize a hazard, and the output user-interface element comprises a warning message. In some embodiments, the processor is further configured to determine a location of the mobile device, based on one or more objects recognized in the received image, and control the output of the display based on the determined location of the mobile device.

In some embodiments, the display is a rectangular shape, and the camera is arranged to capture one or more images from a direction which is parallel to a long axis of the display. The camera can be configured to capture a plurality of images sequentially at a preset interval, and the processor can be configured to receive each of the plurality of images captured by the camera.

In some embodiments, the camera can be configured to capture the plurality of images according to whether or not the display of the mobile device is active. The mobile device can comprise a character recognition unit. The character recognition unit can be configured to receive a text object recognized in the received image from the processor; determine a text string from the received text object; and/or send the determined text string to the processor. Further, the processor can be configured to control the output of the display based on the determined text string.

In some embodiments, the mobile device can include a language unit. The language unit can be configured to receive the text string determined by the character recognition unit from the processor, convert the text string to a translated text string in a second language, and/or send the translated text string to the processor. The processor can be configured to control the output of the display based on the translated text string.

In some embodiments, the mobile device can include an audio output unit. The processor can be configured to control an output of the audio output unit based on one or more recognized objects in the received image.

Another example aspect of the present disclosure is directed to a method of operating a mobile device. The method can include receiving an image captured by a camera of the mobile device in which the camera is arranged to capture one or more images from a direction which is parallel to a first plane of the mobile device, as defined by a plane of a display of the mobile device; recognizing one or more objects present in the received image; and/or controlling an output of the display of the mobile device based on one or more recognized objects in the received image.

In some embodiments, receiving the image can include receiving a plurality of images captured sequentially by the camera at a preset interval. In some embodiments, receiving the plurality of images can include receiving the plurality of images captured by the camera according to whether or not the display of the mobile device is active. The method can include controlling the display to output a user-interface element in response to one or more recognized objects. The user-interface element can be displayed over one or more user-interface elements already being displayed by the display. In some embodiments, the user-interface element output in response to one or more recognized objects can comprise a bar element displayed at a top end of the display when the output of the display has a portrait orientation. Recognizing one or more objects can comprise recognizing a hazard, and the output user-interface element can comprise a warning message.

In some embodiments, the method can include determining a location of the mobile device based on one or more objects recognized in the received image, and controlling the output of the display based on the determined location of the mobile device. The method can include recognizing a text object in the received image from the processor; determining a text string from the recognized text object; and/or controlling the output of the display based on the determined text string.

In some embodiments, the method can include converting the determined text string to a translated text string in a second language and controlling the output of the display based on the translated text string. In some embodiments, the method can include controlling an output of the audio output unit based on one or more recognized objects in the received image.

Another example aspect of the present disclosure is directed to a computer-readable medium comprising a program which, when executed by a processor, performs a method of operating a mobile device. The method performed by the program can include receiving an image captured by a camera of the mobile device in which the camera is arranged to capture one or more images from a direction which is parallel to a first plane of the mobile device, as defined by a plane of a display of the mobile device; recognizing one or more objects present in the received image; and/or controlling an output of the display of the mobile device based on one or more recognized objects in the received image.

In some embodiments, receiving the image can include receiving a plurality of images captured sequentially by the camera at a preset interval. In some embodiments, receiving the plurality of images can include receiving the plurality of images captured by the camera according to whether or not the display of the mobile device is active. In some embodiments, the method performed by the program can include controlling the display to output a user-interface element in response to one or more recognized objects. The user-interface element can be displayed over one or more user-interface elements already being displayed by the display. In some embodiments, the user-interface element output in response to one or more recognized objects can comprise a bar element displayed at a top end of the display when the output of the display has a portrait orientation.

In some embodiments, recognizing one or more objects can comprise recognizing a hazard, and the output user-interface element can comprise a warning message. In some embodiments, the method performed by the program can include determining a location of the mobile device, based on one or more objects recognized in the received image, and controlling the output of the display based on the determined location of the mobile device. In some embodiments, the method performed by the program can include recognizing a text object in the received image from the processor, determining a text string from the recognized text object, and/or controlling the output of the display based on the determined text string.

In some embodiments, the method performed by the program can include converting the determined text string to a translated text string in a second language, and/or controlling the output of the display based on the translated text string. In some embodiments, the method performed by the program can include controlling an output of the audio output unit based on one or more recognized objects in the received image.

The systems, methods, devices, and non-transitory computer-readable media in the disclosed technology can provide a variety of technical effects and benefits to the overall process of recognizing an environment based on sensor outputs from one or more sensors, generating one or more semantic objects based on the sensor outputs, and performing one or more actions based on the one or more semantic objects. The disclosed technology can reduce or eliminate the need for a user to engage in manual interaction to gather information about their environment and the objects in that environment. The reductions in manual interaction can result from automated processing of sensor data that can persistently monitor the state of the environment, determine an optimal operational mode, and generate indications in a more efficient manner (e.g., using fewer steps to produce an output). In situations in which manual selection is still used, the disclosed technology can reduce the amount of human intervention by performing commonly used functions including translation, image recognition, and association of semantic data with external data sources more rapidly than without the assistance of the disclosed technology (e.g., by eliminating one or more steps performed in the different functions).

By changing operating mode based on conditions in the environment, the disclosed technology can maximize the use of computing resources by selectively activating sensors and selectively performing various operations. For example, by determining an operating mode to use and one or more specific actions to perform (e.g., text translation), the disclosed technology can avoid the excessive resource usage (e.g., battery power and/or network transmissions) that can result from a more haphazard approach that does not include generation and analysis of semantic objects associated with an environment. Additionally, the disclosed technology can leverage the power of a machine learned model, including a locally stored machine learned model that can be accessed without the need to use network resources (e.g., network bandwidth to contact a machine learned model that is stored on a remote computing device).

In this way, the disclosed technology is able to reduce or otherwise improve the efficiency of a user's interaction with a device. By changing operating mode and/or performing one or more actions based on the environment and one or more semantic objects associated with the environment, without the intervention of a user, the disclosed technology can lead a user to a desired information result or action in a shorter amount of time, or with fewer interaction steps. Hence, particularly in the field of mobile devices, the disclosed technology can lead to a reduction in the power consumption demands associated with a screen-on time and with processor usage, these power consumption demands can be of particular importance in a mobile device. The disclosed technology can reduce the demands for processing time associated with processing a user input query, and processing a response to such a query. By increasing the number of instances in which a user can be provided with a desired information result or action, without processing and responding to a user input query, the disclosed technology over time can result in significant consumption of power and processing resources over time. By extension, by reducing the number of instances in which a query must be sent to a remote computing device, the disclosed technology can provide efficiencies in network usage across a system of mobile devices which implement the disclosed technology.

The disclosed technology also offers the benefits of being able to be configured with various sensors (e.g., a periscopic camera) positioned in a way that is more ergonomic for a user (e.g., more ergonomic for a user to hold) and that capture a wider field of view of the environment surrounding the user. Sensors, such as a periscope camera, may be positioned on a device in a way that improves the passive collection of sensor data from the environment, based on a normal or natural holding configuration of the device, such that the sensors can persistently monitor the state of the environment without an active gesture or action by a user of the device. Further, the disclosed technology can use semantic objects based on data captured from local sensors to enrich directions in pathfinding applications which can be displayed in one or more interface elements (e.g., a status bar indicator that includes a pathfinding indicator to indicate pathfinding is being performed and/or an object recognition indicator to indicate that object recognition is being performed)). For example, the disclosed technology can use local landmarks or other objects within view of a camera on the device as cues to enhance directions.

Accordingly, the disclosed technology provides more effective sensor based semantic object generation in a variety of environments along with the added benefits of lower resource usage (e.g., improved utilization of battery and network resources) that result from a semantic object driven approach to gathering and processing the state of the environment.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

With reference now to the FIGS. 1-17, example aspects of the present disclosure will be disclosed in greater detail. FIG. 1 depicts a diagram of an example system 100 according to example embodiments of the present disclosure. The system 100 can include a user device 102; a remote computing device 104; a communication network 106; an object recognition component 110; object data 114 (e.g., data associated with one or more physical objects and/or one or more semantic objects); and a geographic information system 120.

The user device 102 can receive object data (e.g., information associated with one or more objects detected or recognized by the user device 102) from the remote computing device 104 via a communication network 106. The object recognition component 110, which can operate or be executed on the user device 102, can interact with the remote computing device 104 via the network 106 to perform one or more operations including detection and/or recognition of one or more objects; generation of one or more semantic objects; and/or generation of one or more outputs (e.g., physical outputs including visual indications, audio indications, and/or haptic indications). In some embodiments, the object recognition component 110 can include a machine learned model that can be used to detect and/or recognize objects and which can also be used in the generation of one or more semantic objects. The network 106 can include any type of communications network, such as a local area network (e.g. intranet), wide area network (e.g. Internet), cellular network, or some combination thereof. The network 106 can also include a direct connection. In general, communication can be carried via network 106 using any type of wired and/or wireless connection, using a variety of communication protocols (e.g. TCP/IP, HTTP, SMTP, FTP), encodings or formats (e.g. HTML or XML), and/or protection schemes (e.g. VPN, secure HTTP, or SSL).

The user device 102 can include one or more computing devices including a tablet computing device, a device that is able to be worn (e.g., a smart watch or a smart band), a laptop computing device, a desktop computing device, a mobile computing device (e.g., a smartphone), and/or a display device with one or more processors.

The object recognition component 110 can be implemented on the user device 102. The object recognition component 110 can implement object detection and/or recognition of one or more objects. Further, the object recognition component 110 can assist in the generation of one or more semantic objects based on one or more sensory outputs from one or more sensors (not shown). The sensory outputs can be associated with one or more images or sounds associated with one or more objects in an environment. The object recognition component 110 can be operated or executed locally on the user device 102, through a web application accessed via a web browser implemented on the user device 102, or through a combination of local execution or operation on user device 102 and remote execution or operation on a remote computing device which can include the remote computing device 104 or the geographic information system 120.

The object recognition component 110 can be configured to generate, process, or modify data including image data (e.g., image files), audio data (e.g., sound files), and/or navigational data (e.g., the location of places of interest associated with the image data) that can be used by a user.

In some embodiments, the remote computing device 104 can include one or more computing devices including servers (e.g., web servers). The one or more computing devices can include one or more processors and one or more memory devices. The one or more memory devices can store computer-readable instruction to implement, for example, one or more applications that are associated with the object data 114. In some embodiments, the object data 114 can be associated, for instance, with a geographic information system 120.

The geographic information system 120 can be associated with or include data that is indexed according to geographic coordinates (e.g., latitude and longitude) of its constituent elements (e.g., locations). The data associated with the geographic information system 120 can include map data, image data, geographic imagery, and/or data associated with various waypoints (e.g., addresses or geographic coordinates). The object data 114 as determined or generated by the remote computing device 104 can include data associated with the state or characteristics of one or more objects and/or one or more semantic objects including for example, object identifiers (e.g., location names and/or names of objects), prices of objects, locations of objects, and/or ownership of objects.

Figure 2:
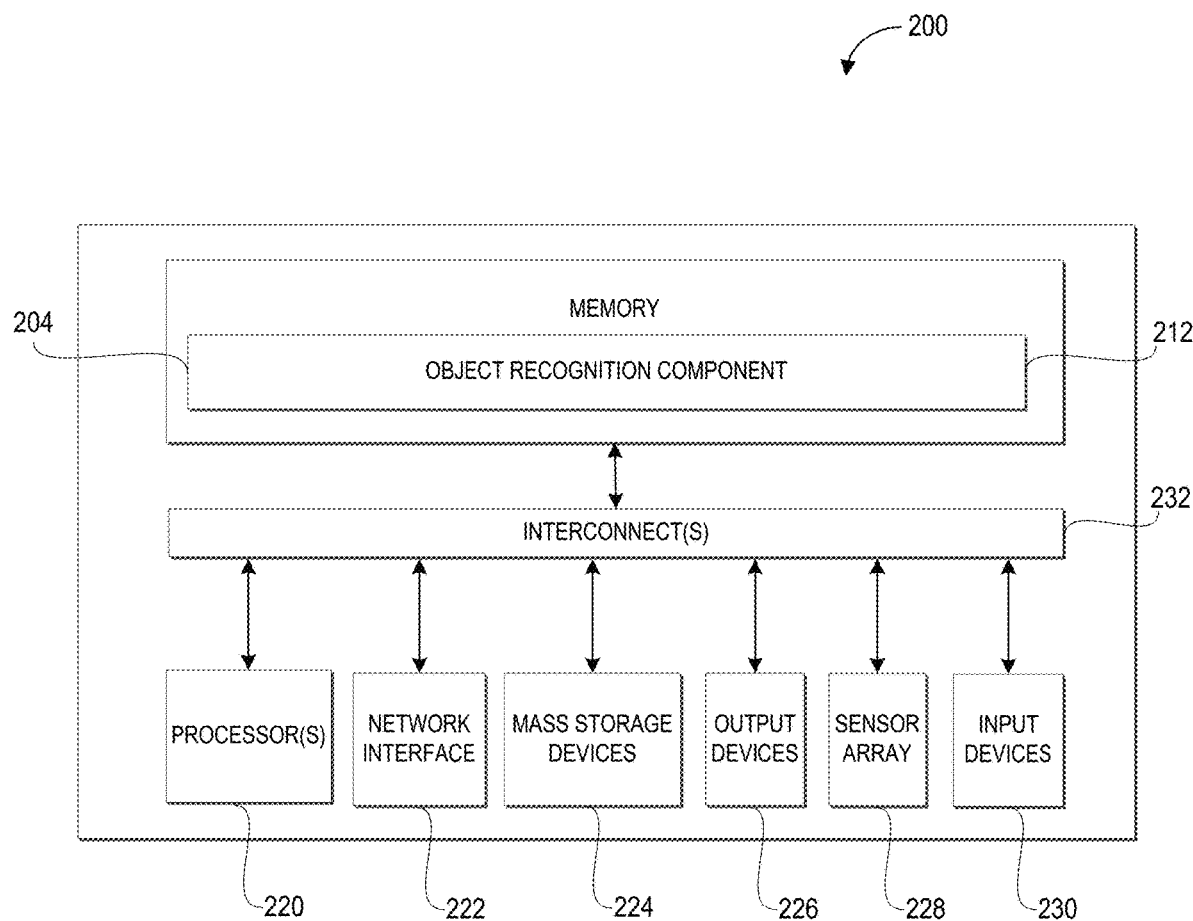
FIG. 2 depicts a diagram of an example device according to example embodiments of the present disclosure.

FIG. 2 depicts an example computing device 200 that can be configured to generate semantic objects and an output based on the detection or recognition of the state of an environment that includes objects according to example embodiments of the present disclosure. The computing device 200 can include one or more portions of one or more systems (e.g., one or more computing systems) or devices (e.g., one or more computing devices) including the user device 102 and/or the remote computing device 104, which are shown in FIG. 1. As shown, the computing device 200 an include a memory 204; an object recognition component 212 that can include one or more instructions that can be stored on the memory 204; one or more processors 220 configured to execute the one or more instructions stored in the memory 204; a network interface 222 that can support network communications; one or more mass storage devices 224 (e.g., a hard disk drive or a solid state drive); one or more output devices 226 (e.g., one or more display devices); a sensor array 228 (e.g., one or more optical and/or audio sensors); one or more input devices 230 (e.g., one or more touch detection surfaces); and/or one or more interconnects 232 (e.g., a bus used to transfer one or more signals or data between computing components in a computing device). The one or more processors 220 can include any processing device that can, for example, process and/or exchange (send or receive) one or more signals or data associated with a computing device.

For example, the one or more processors 220 can include single or multiple core devices including a microprocessor, microcontroller, integrated circuit, and/or logic device. The memory 204 and the storage memory 224 are illustrated separately, however, the components 204 and 224 can be regions within the same memory module. The computing device 200 can include one or more additional processors, memory devices, network interfaces, which may be provided separately or on a same chip or board. The components 204 and 224 can include one or more computer-readable media, including, but not limited to, non-transitory computer-readable media, RAM, ROM, hard drives, flash drives, and/or other memory devices.

The memory 204 can store sets of instructions for applications including an operating system that can be associated with various software applications or data. The memory 204 can be used to operate various applications including a mobile operating system developed specifically for mobile devices. As such, the memory 204 can perform functions that allow the software applications to access data including wireless network parameters (e.g., identity of the wireless network, quality of service), and invoke various services including telephony, location determination (e.g., via global positioning service (GPS) or WLAN), and/or wireless network data call origination services. In other implementations, the memory 204 can be used to operate or execute a general-purpose operating system that operates on both mobile and stationary devices, such as smartphones and desktop computers, for example. In some embodiments, the object recognition component 212 can include a machine learned model that can be used to detect and/or recognize objects. Further, the object recognition component can be used in the generation of one or more semantic objects.

The sensor array 228 can include one or more sensors that can detect changes in the state of an environment that includes one or more objects. For example, the sensor array 228 can include one or more optical sensors, motion sensors, thermal sensors, audio sensors, haptic sensors, pressure sensors, humidity sensors, and/or electromagnetic sensors. The one or more input devices 230 can include one or more devices for entering input into the computing device 200 including one or more touch sensitive surfaces (e.g., resistive and/or capacitive touch screens), keyboards, mouse devices, microphones, and/or stylus devices. The one or more output devices 226 can include one or more devices that can provide a physical output including visual outputs, audio outputs, and/or haptic outputs. For example, the one or more output devices 226 can include one or more display components (e.g., LCD monitors, OLED monitors, and/or indicator lights), one or more audio components (e.g., loud speakers), and/or one or more haptic output devices that can produce movements including vibrations.

The software applications that can be operated or executed by the computing device 200 can include the object recognition component 110 shown in FIG. 1. Further, the software applications that can be operated or executed by the computing device 200 can include native applications or web-based applications.

In some implementations, the user device can be associated with or include a positioning system (not shown). The positioning system can include one or more devices or circuitry for determining the position of a device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position. The positioning system can determine a user location of the user device. The user location can be provided to the remote computing device 104 for use by the object data provider in determining travel data associated with the user device 102.

The one or more interconnects 232 can include one or more interconnects or buses that can be used to exchange (e.g., send and/or receive) one or more signals (e.g., electronic signals) and/or data between components of the computing device 200 including the memory 204, the object recognition component 212, the one or more processors 220, the network interface 222, the one or more mass storage devices 224, the one or more output devices 226, the sensor array 228, and/or the one or more input devices 230. The one or more interconnects 232 can be arranged or configured in different ways including as parallel or serial connections. Further the one or more interconnects 232 can include one or more internal buses to connect the internal components of the computing device 200; and one or more external buses used to connect the internal components of the computing device 200 to one or more external devices. By way of example, the one or more interconnects 232 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, and/or IEEE 1394 interface (FireWire).

Figure 3:
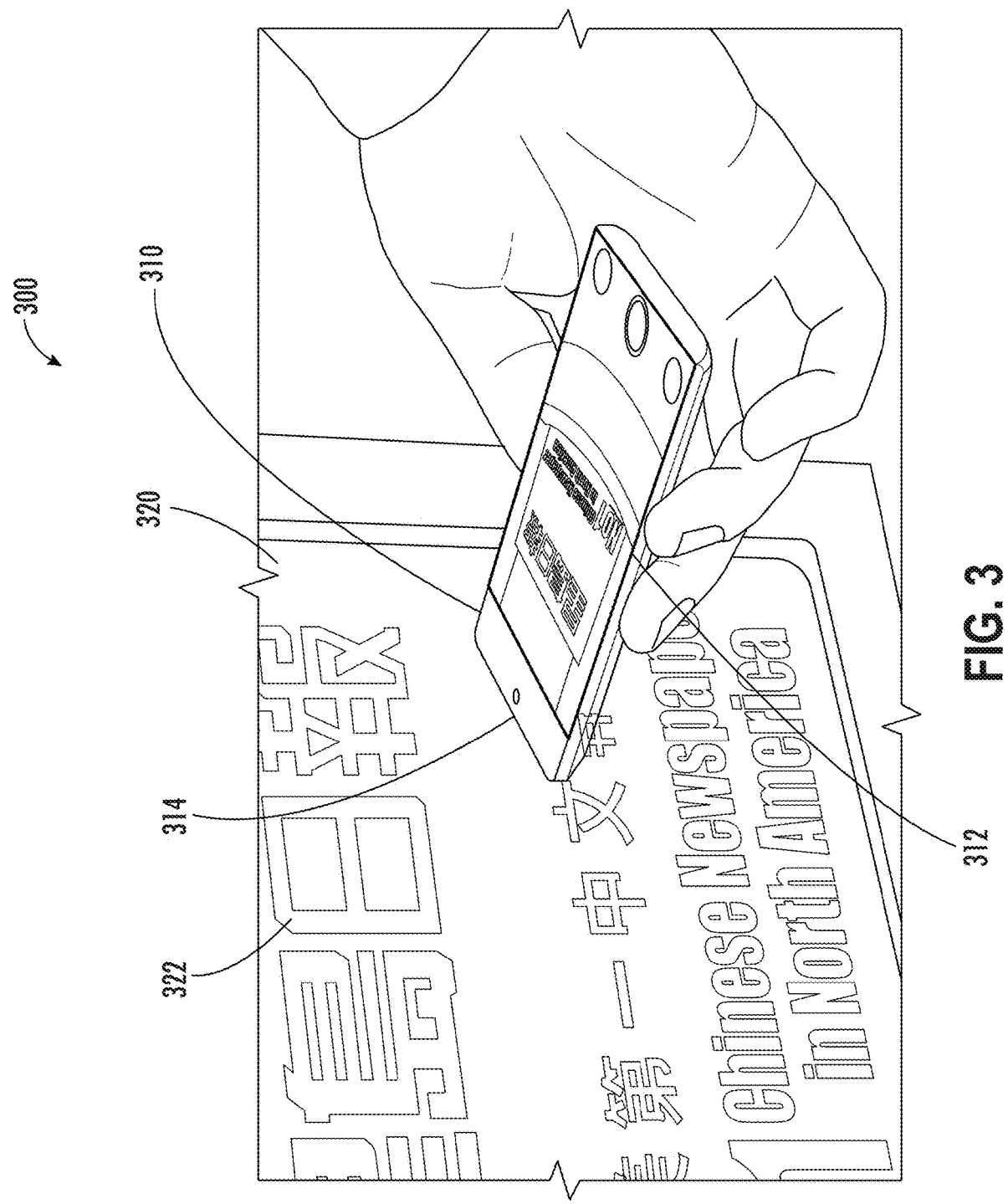
FIG. 3 depicts an example of sensor based semantic object generation including image capture according to example embodiments of the present disclosure.

FIG. 3 depicts an example of sensor based semantic object generation including image capture according to example embodiments of the present disclosure. FIG. 3 includes an illustration of an environment 300, one or more portions of which can be detected, recognized, and/or processed by one or more systems (e.g., one or more computing systems) or devices (e.g., one or more computing devices) including, the user device 102 shown in FIG. 1, the remote computing device 104 shown in FIG. 1, and/or the computing device 200 shown in FIG. 2. Further, the detection, recognition, and/or processing of one or more portions of the environment 300 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 3, the environment 300 includes a semantic processing system 310, a display component 312, an edge portion 314, an object 320, and a text portion 322.

The display component 312 of the semantic processing system 310 can display one or more images of an environment, including the environment 300. The one or more images displayed by the display component 312 can be captured by one or more sensors (e.g., one or more cameras) of the semantic processing system 310. In this example, the display component 312 uses a camera (e.g., a periscopic camera) positioned on the edge portion 314 of the semantic processing system 310 that captures an image of an object 320, which is a poster with text in a combination of languages (English and Chinese). In some embodiments, the one or more sensors can be located anywhere on the semantic processing system 310. Further, the semantic processing system 310 can receive sensory outputs from one or more external devices (e.g., a remote camera can provide video imagery to the semantic processing system 310).

The semantic processing system 310 can output one or more images of the object 320, including the text portion 322, on the display component 312. As illustrated in FIG. 3, the disclosed technology can output images of an environment onto a display component of a device that can receive one or more inputs from a user.

Figure 4:
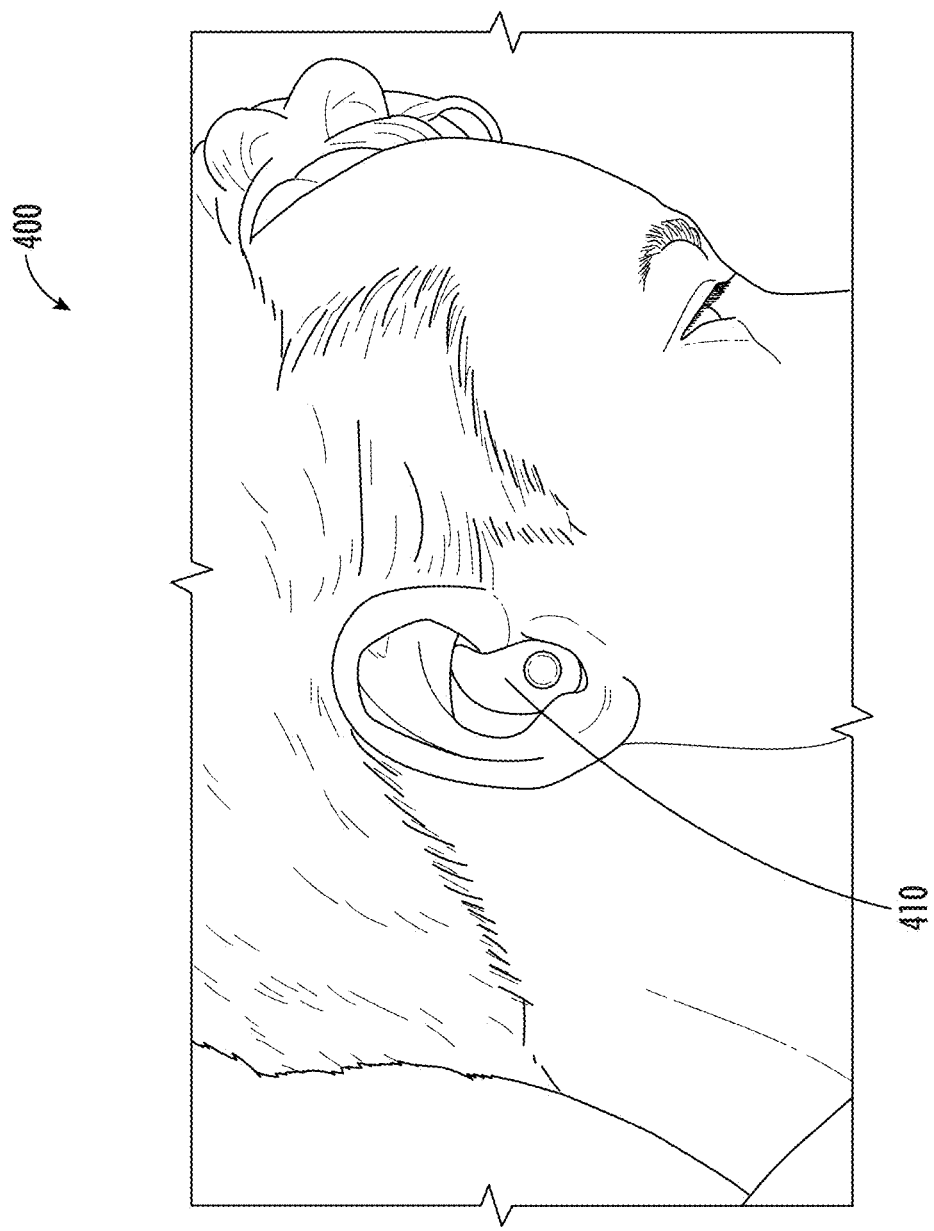
FIG. 4 depicts an example of sensor based semantic object generation including audio generation according to example embodiments of the present disclosure.

FIG. 4 depicts an example of sensor based semantic object generation including audio generation according to example embodiments of the present disclosure. FIG. 4 includes an illustration of an environment 400, one or more portions of which can be detected, recognized, and/or processed by one or more systems (e.g., one or more computing systems) or devices (e.g., one or more computing devices) including a semantic processing system audio component 410 that can include one or more portions of the user device 102 shown in FIG. 1, the remote computing device 104 shown in FIG. 1, and/or the computing device 200 shown in FIG. 2. Further, the detection, recognition, and/or processing of one or more portions of the environment 400 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 4, the environment 400 includes a semantic processing system audio output component 410.

The semantic processing system audio output component 410 can include one or more components that can output sounds including outputting sounds via one or more speakers of the semantic processing system audio output component 410. For example, the semantic processing system audio output component 410 can receive one or more signals (e.g., one or more signals including data) from a system or device such as the user device 102 or the computing device 200. The one or more signals can be transmitted wirelessly or via wire and received by a receiving component (not shown) of the semantic processing system audio output component 410. The one or more signals can include data associated with one or more indications about the state of an environment that includes one or more objects. For example, the one or more signals can include audio that is based on a portion of text that was recognized (e.g., text to speech translation) or directions to a location (e.g., audio instructions of directions to a destination location).

Figure 5:
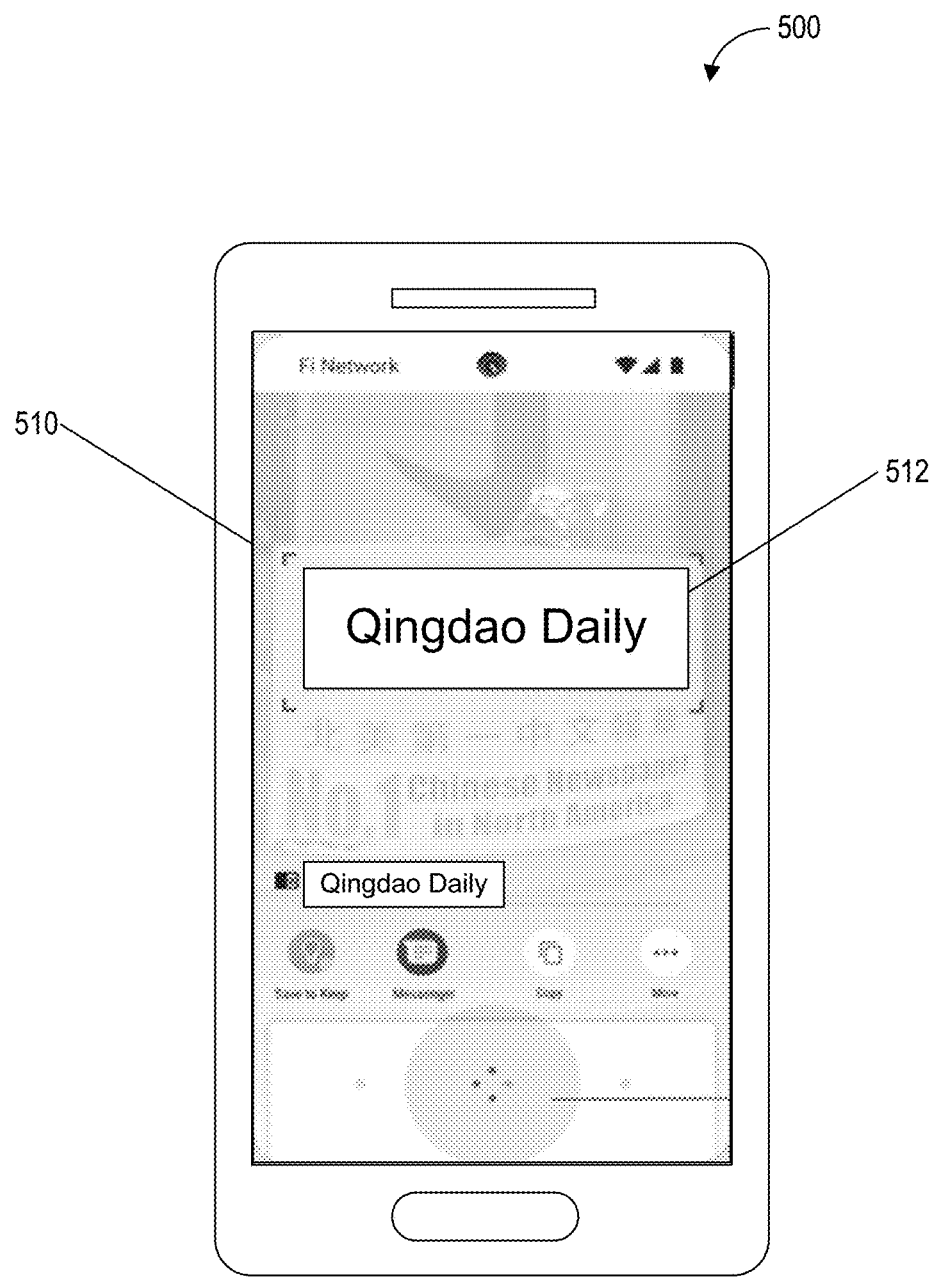
FIG. 5 depicts an example of sensor based semantic object generation including text translation according to example embodiments of the present disclosure.

FIG. 5 depicts an example of sensor based semantic object generation including text translation according to example embodiments of the present disclosure. FIG. 5 includes an illustration of semantic processing system 500 that can include one or more systems (e.g., one or more computing systems) or devices (e.g., one or more computing devices) including the user device 102 shown in FIG. 1, the remote computing device 104 shown in FIG. 1, and/or the computing device 200 shown in FIG. 2. Further, the detection, recognition, and/or processing of one or more portions of an environment by the semantic processing system 500 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 5, the semantic processing system 500 includes a display component 510 and a text portion 512.

The semantic processing system 500 can display one or more images of an environment that includes one or more objects on a display component 510. The one or more images can be captured by one or more sensors (not shown) of the semantic processing system 500. In this example, the display component 510 outputs a display of a poster with text in a combination of languages (English and Chinese). The semantic processing system 500 can generate a semantic object corresponding to the text detected in the environment, translate the text, and output the text portion 512 that is shown on the display component 510. For example, the semantic processing system 500 can superimpose a translated English text ("Qingdao Daily") over Chinese text captured by the semantic processing system 500.

Figure 6:
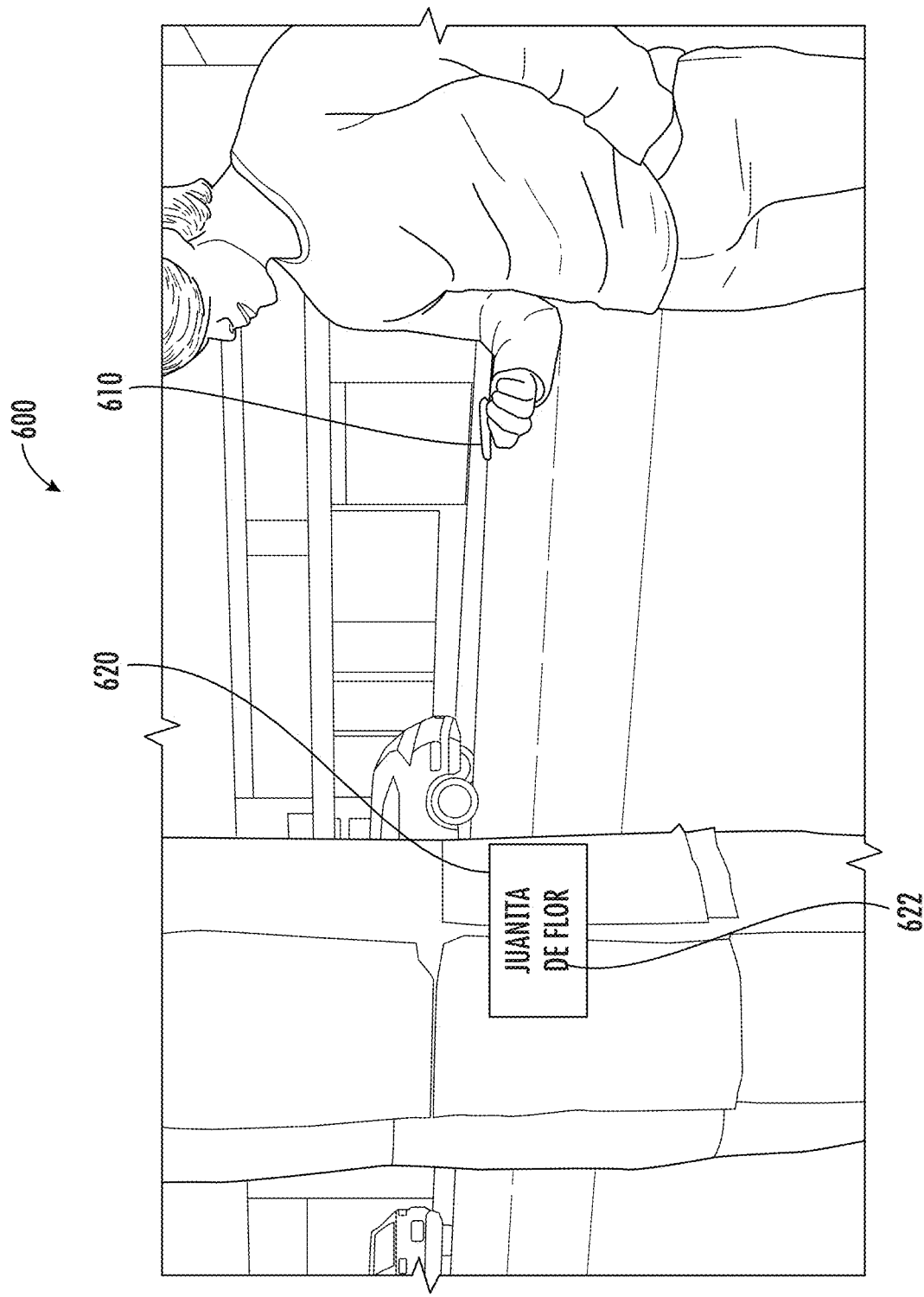
FIG. 6 depicts an example of sensor based semantic object generation including text recognition according to example embodiments of the present disclosure.

FIG. 6 depicts an example of sensor based semantic object generation including text recognition according to example embodiments of the present disclosure. FIG. 6 includes an illustration of an environment 600, one or more portions of which can be detected, recognized, and/or processed by one or more systems (e.g., one or more computing systems) or devices (e.g., one or more computing devices) including a semantic processing system 610 that can include one or more portions of the user device 102 shown in FIG. 1, the remote computing device 104 shown in FIG. 1, and/or the computing device 200 shown in FIG. 2. Further, the detection, recognition, and/or processing of one or more portions of the environment 600 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 6, the environment 600 includes the semantic processing system 610, an object 620, and a text portion 622.

The semantic processing system 610 can capture one or more images via one or more sensors (e.g., one or more cameras). The semantic processing system 610 can include one or more periscopic cameras (not shown) that can be positioned on the semantic processing system 610 so that the wide field of view of the one or more periscopic cameras can capture the state of the environment 600 including the object 620 (e.g., a poster) that includes a text portion 622 ("Juanita de Flor"). The positioning of the one or more periscopic cameras allows a user of the semantic processing system 610 to capture one or more images of one or more objects in an environment while holding the semantic processing system 610 in an ergonomically comfortable position.

Figure 7:
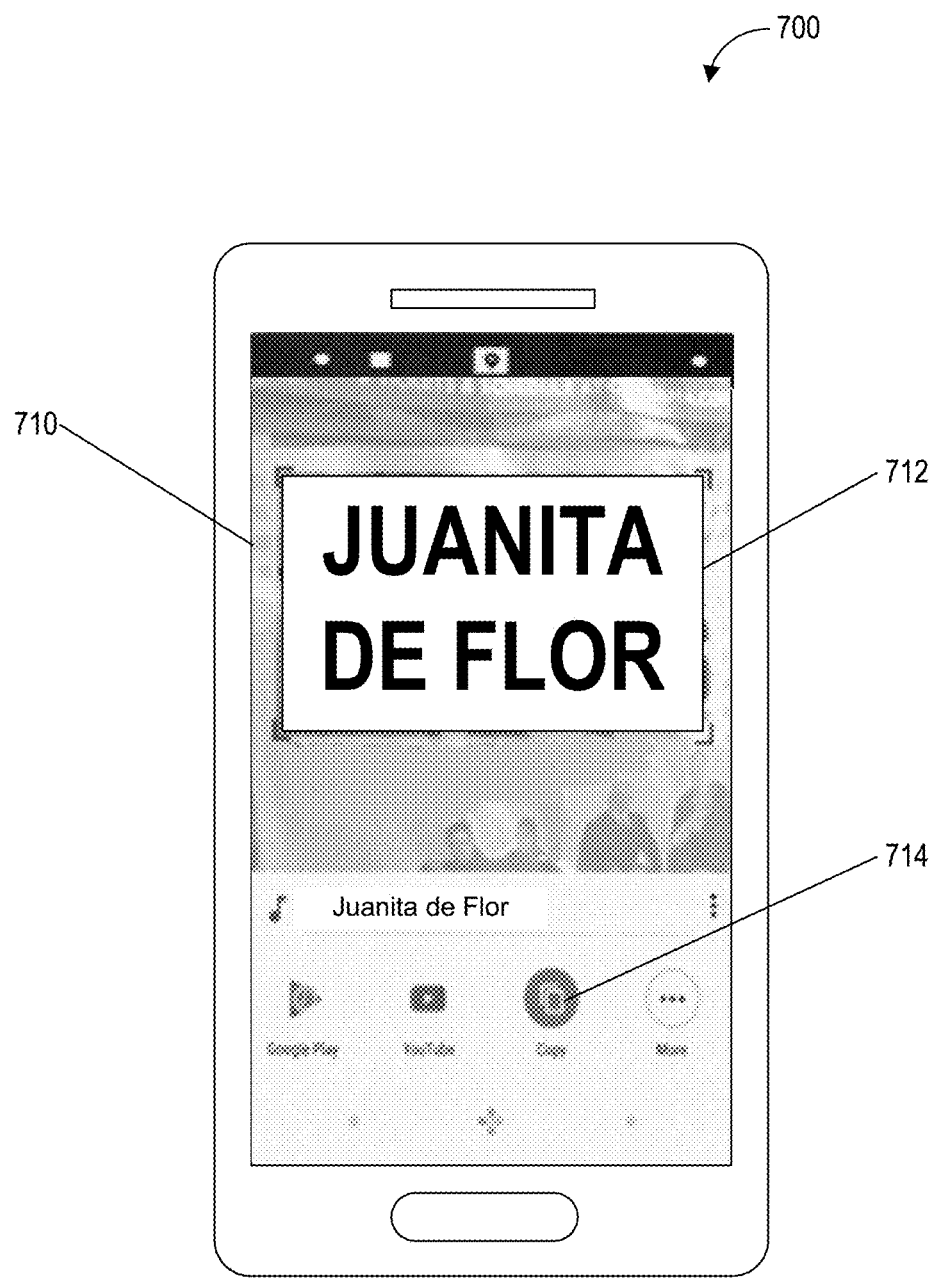
FIG. 7 depicts an example of sensor based semantic object generation including text recognition according to example embodiments of the present disclosure.

FIG. 7 depicts an example of sensor based semantic object generation including text recognition according to example embodiments of the present disclosure. FIG. 7 includes an illustration of a semantic processing system 700 that can include one or more portions of one or more systems (e.g., one or more computing systems) or devices (e.g., one or more computing devices) including, the user device 102 shown in FIG. 1, the remote computing device 104 shown in FIG. 1, and/or the computing device 200 shown in FIG. 2. Further, the detection, recognition, and/or processing of one or more portions of an environment by the semantic processing system 700 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 7, the semantic processing system 700 includes a display component 710, an image object 712, and an interface element 714.

The semantic processing system 700 can display one or more images of an environment that includes one or more objects on the display component 710. The one or more images displayed on the display component 710 can be captured by one or more sensors (not shown) of the semantic processing system 700. In this example, the display component 710 outputs the image object 712 that includes a visual representation of a portion of a poster with text ("Juanita de Flor"). The semantic processing system 700 can recognize that the object (e.g., the poster) associated with the image object 712 includes text and can generate a semantic object based on the image object 712 (e.g., a semantic object based on recognizing an object). Based on the semantic object, the semantic processing system 700 can determine that the image object 712 is associated with a musician, "Juanita de Flor," and can access a remote computing device (e.g., the remote computing device 104) that includes data (e.g., a music audio file) associated with the semantic object that was generated. Based on the identity of the semantic object (e.g., the musician's name), the semantic processing system 700 can generate one or more interface elements, including the interface element 714, on the display component 710 that will allow a user to access or control information related to the semantic object. For example, the interface element 714 can be used to copy a music audio file associated with the semantic object generated by the semantic processing system 700.

Figure 8:
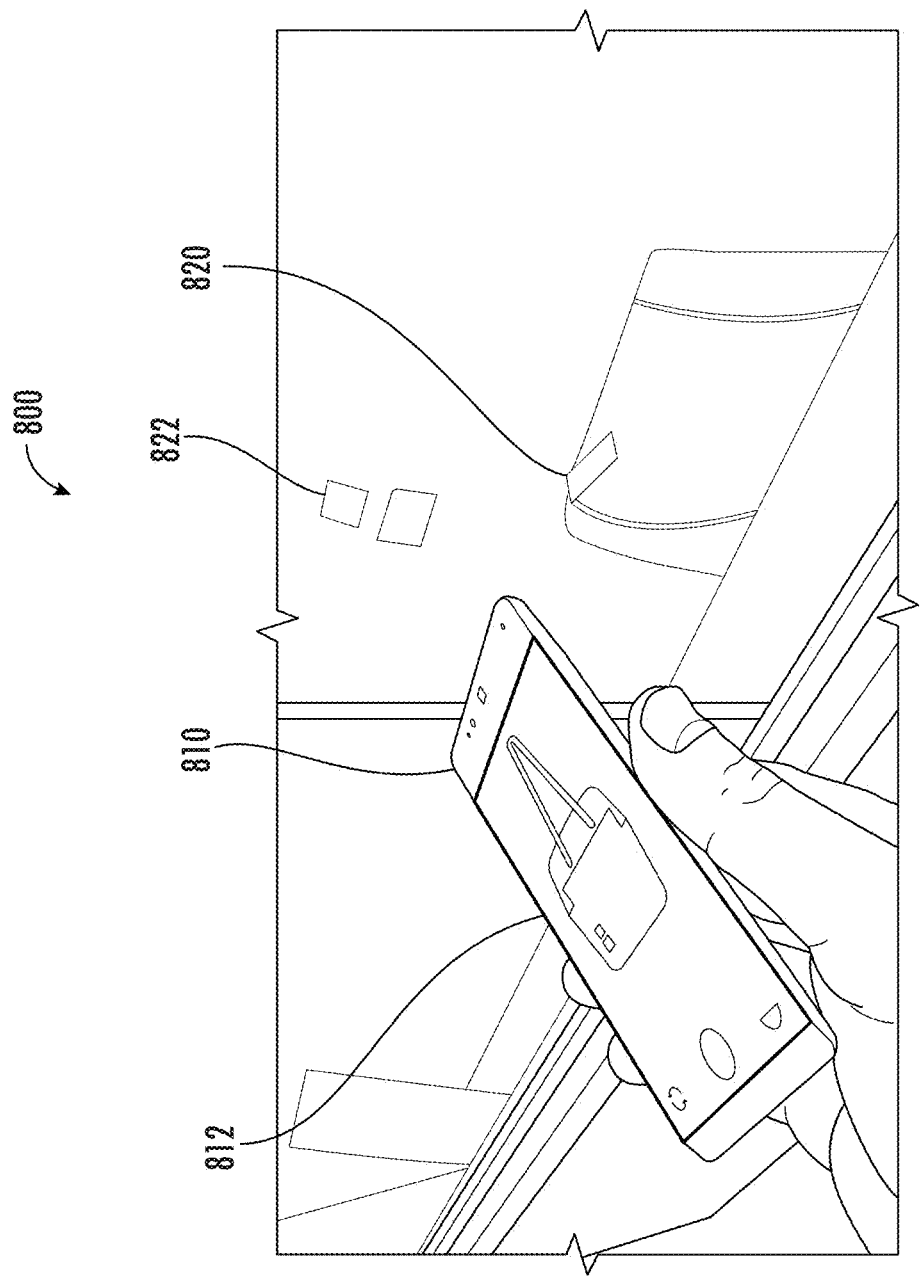
FIG. 8 depicts an example of sensor based semantic object generation including object recognition according to example embodiments of the present disclosure.

FIG. 8 depicts an example of sensor based semantic object generation including object recognition according to example embodiments of the present disclosure. FIG. 8 includes an illustration of an environment 800, one or more portions of which can be detected, recognized, and/or processed by one or more systems (e.g., one or more computing systems) or devices (e.g., one or more computing devices) including a semantic processing system that can include one or more portions of the user device 102 shown in FIG. 1, the remote computing device 104 shown in FIG. 1, and/or the computing device 200 shown in FIG. 2. Further, the detection, recognition, and/or processing of one or more portions of the environment 800 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 8, the environment 800 includes a semantic processing system 810, a display component 812, an object 820, and an object label 822.

The display component 812 of the semantic processing system 810 can display one or more images based on the environment 800. The one or more images displayed by the display component 812 can be captured by one or more sensors (not shown) of the semantic processing system 810. The semantic processing system 810 can capture an image of the object 820, which is a handbag. The semantic processing system 810 can generate a semantic object, based on recognition by the semantic processing system 810, that the object 820 is a handbag. The semantic processing system 810 can detect the object label 822, and based on detecting the object label 822, can generate one or more attributes of the semantic object associated with the object 820, including for example, an object brand attribute that can be assigned a value based on the brand of the object 820 that is determined by the semantic processing system 810. For example, to determine the value of the object brand attribute, the semantic processing system 810 can access a remote computing system that can include data associated with the object brand attribute, and can use the data to associate a value (e.g., the brand of the handbag maker) with the object brand attribute.

Figure 9:
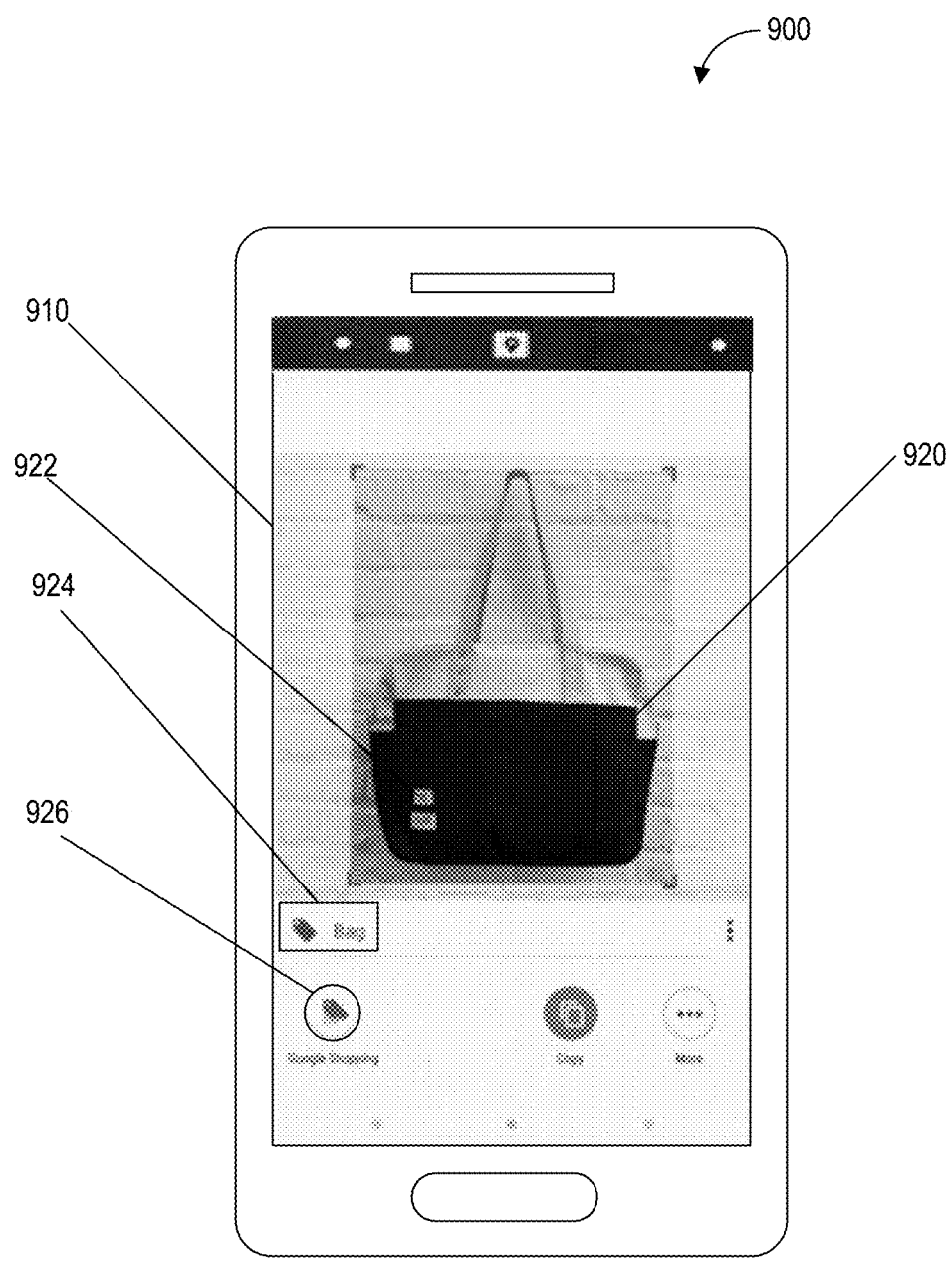
FIG. 9 depicts an example of sensor based semantic object generation including object recognition according to example embodiments of the present disclosure.

FIG. 9 depicts an example of sensor based semantic object generation including object recognition according to example embodiments of the present disclosure. FIG. 9 includes an illustration of a semantic processing system 900 that can include one or more portions of one or more systems (e.g., one or more computing systems) or devices (e.g., one or more computing devices) including, the user device 102 shown in FIG. 1, the remote computing device 104 shown in FIG. 1, and/or the computing device 200 shown in FIG. 2. Further, the detection, recognition, and/or processing of one or more portions of an environment by the semantic processing system 900 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 9, the semantic processing system 900 includes a display component 910, an image object 920, an image object portion 922, an object identifier 924, and an interface element 926.

The semantic processing system 900 can display one or more images of an environment (e.g., an environment including one or more objects) on a display component 910. The one or more images can be captured by one or more sensors (e.g., one or more cameras) of the semantic processing system 900 which can be located on one or more portions of the semantic processing system 900. In this example, the display component 910 outputs a display of an object 920. The semantic processing system 900 can recognize that the object 920 is a handbag that includes an object label 922. The semantic processing system 900 can generate a semantic object attribute based on the object label 922. Based on the attributes of the semantic object (e.g., the object is a handbag with a label from a particular manufacturer), the semantic processing system 900 can generate display output including the object identifier 924 ("Bag") and interface elements, including the interface element 926. The interface element 926 can be a control element that, upon activation by a user (e.g., touching the interface element 926 and/or issuing a voice command directed at the interface element 926), can perform one or more actions including accessing an Internet web site that sells goods or services including the object 920 and/or providing more information about the object 920.

Figure 10:
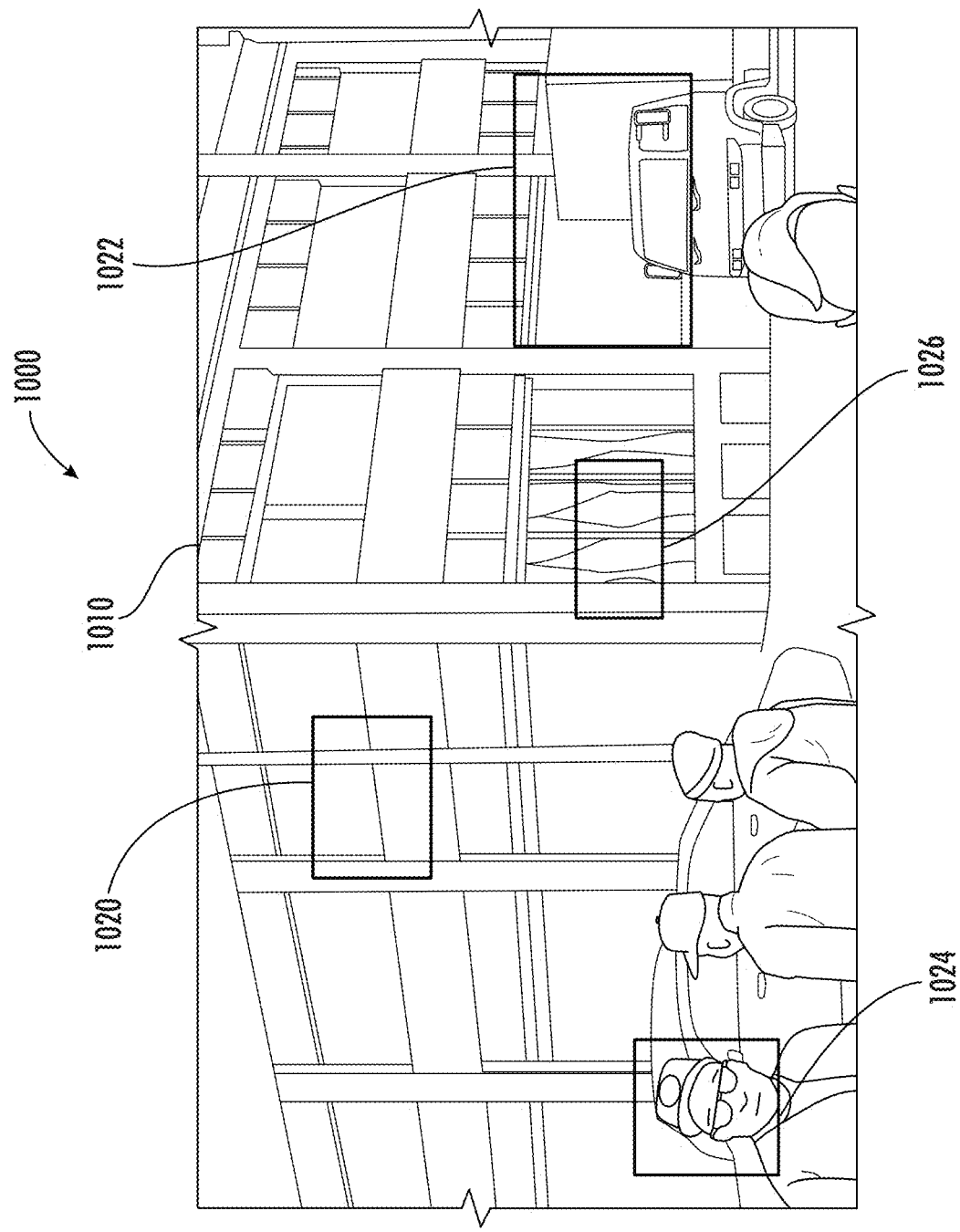
FIG. 10 depicts an example of sensor based semantic object generation including location identification according to example embodiments of the present disclosure.

FIG. 10 depicts an example of sensor based semantic object generation including location identification according to example embodiments of the present disclosure. FIG. 10 includes an illustration of a semantic processing system 1000 that can include one or more portions of one or more systems (e.g., one or more computing systems) or devices (e.g., one or more computing devices) including, the user device 102 shown in FIG. 1, the remote computing device 104 shown in FIG. 1, and/or the computing device 200 shown in FIG. 2. Further, the detection, recognition, and/or processing of one or more portions of an environment by the semantic processing system 1000 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 10, the semantic processing system 1000 includes a display component 1010, an object 1020, an object 1022, an object 1024, and an object 1026.

In this example, a display component 1010 of the semantic processing system 1000 displays an environment that includes one or more objects (e.g., people, a building, a street, and vehicles) that is captured by a camera (not shown) of the semantic processing system 1000. The display component 1010 shows objects that have been detected and/or recognized by the semantic processing system 1000, including the object 1020 that is determined to be a street address; the object 1022 that is determined to be signage associated with a service (a transportation service); the object 1024 that is determined to be a face; and the object 1026 that is determined to be signage associated with a service (a restaurant).

The semantic processing system 1000 can generate semantic objects based on the objects 1020, 1022, 1024, and/or 1026. For example, a semantic object based on the object 1020 can be used to determine location (e.g., location can be determined based on the street address when GPS service is unavailable); a semantic object based on the object 1022 can be used to determine whether a delivery vehicle with a package for a user is nearby; and/or a semantic object based on the object 1026 can be used to identify the restaurant associated with the object 1026 and provide information (e.g., ratings of food and service) to a user of the semantic processing system 1000.

Further, a semantic object based on the object 1024 can be used to determine whether a person (e.g., a friend of the user of the semantic processing system 1000) who has expressly given their permission to recognize their face to a user of the semantic processing system 1000 is nearby. In some embodiments, to safeguard the privacy of individuals whose images are captured by the semantic processing system 1000, personal identification data (e.g., facial recognition data) can be stored locally on the semantic processing system 1000 in a secured portion (e.g., an encrypted storage area) of the semantic processing system 1000 that is not shared with or accessible to any other devices.

The display component 1010 can be configured to receive one or more inputs to interact with interface elements that are displayed on the display component 1010. For example, based on a user can touching a portion of the display component 1010 that displays a recognized object, the semantic processing system 1000 can access information associated with a semantic object associated the recognized object.

Figure 11:
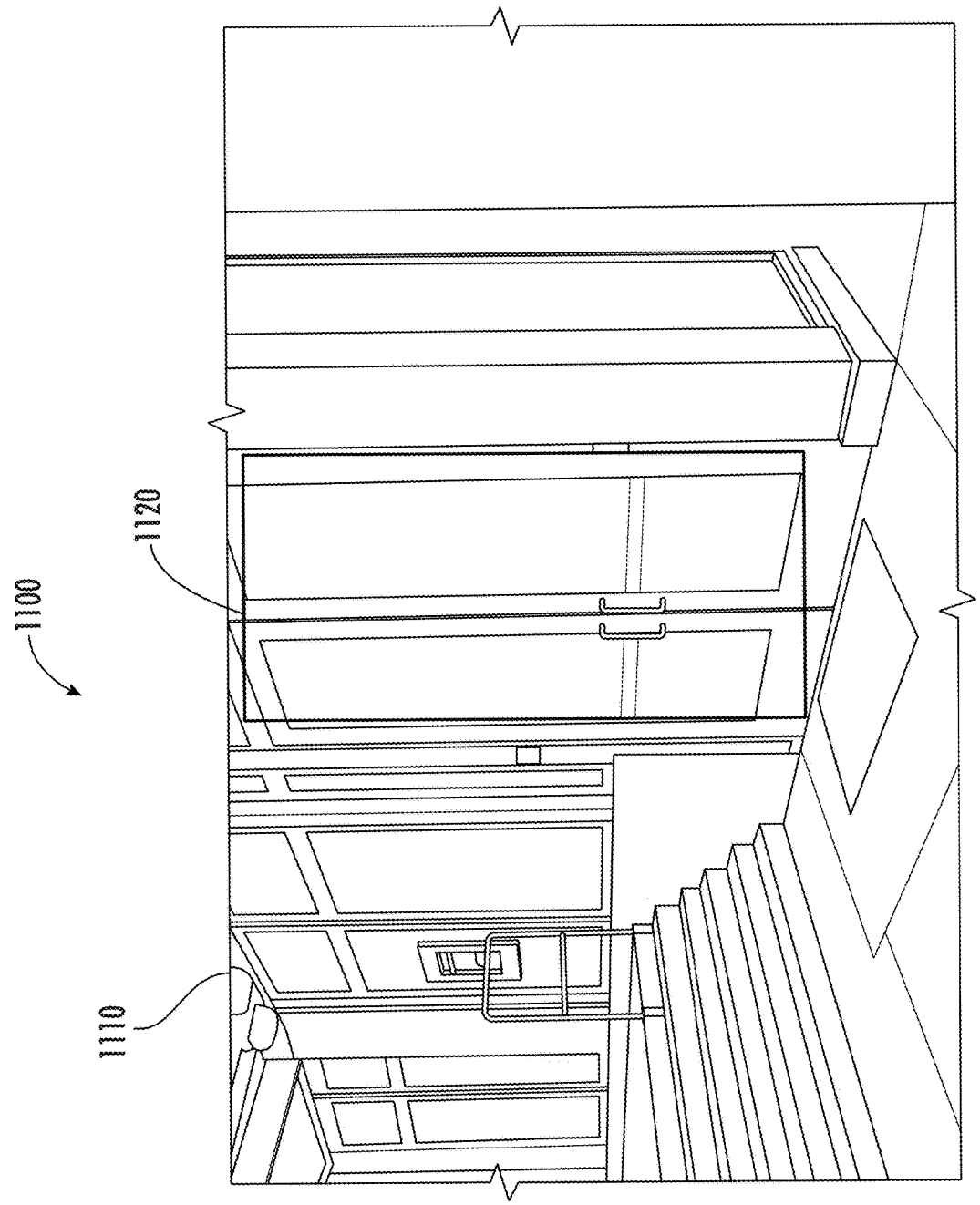
FIG. 11 depicts an example of sensor based semantic object generation including location identification according to example embodiments of the present disclosure.

FIG. 11 depicts an example of sensor based semantic object generation including location identification according to example embodiments of the present disclosure. FIG. 11 includes an illustration of a semantic processing system 1100 that can include one or more portions of one or more systems (e.g., one or more computing systems) or devices (e.g., one or more computing devices) including, the user device 102 shown in FIG. 1, the remote computing device 104 shown in FIG. 1, and/or the computing device 200 shown in FIG. 2. Further, the detection, recognition, and/or processing of one or more portions of an environment by the semantic processing system 1100 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 11, the semantic processing system 1000 includes a display component 1110 and an object 1120.

In this example, a display component 1110 of the semantic processing system 1100 displays an environment captured by a camera (not shown) of the semantic processing system 1100. The display component 1110 displays objects that have been detected and/or recognized by the semantic processing system 1100 including the object 1120 which is determined to be an entrance to a location to which a user is travelling. The semantic processing system can generate a semantic object based on the object 1120 that can be used to provide navigational instructions to a user of the semantic processing system 1100. In some environments, entrances to different locations can be in close proximity to one another, and a geolocation signal (e.g., GPS) may not be available or may be too inaccurate to distinguish between a correct entrance and an incorrect entrance. Accordingly, the semantic processing system 1100 can recognize the correct entrance by generating a semantic object based on visual input from the location and providing a user of the semantic processing system 1100 with directions based on the generated semantic object.

Figure 12:
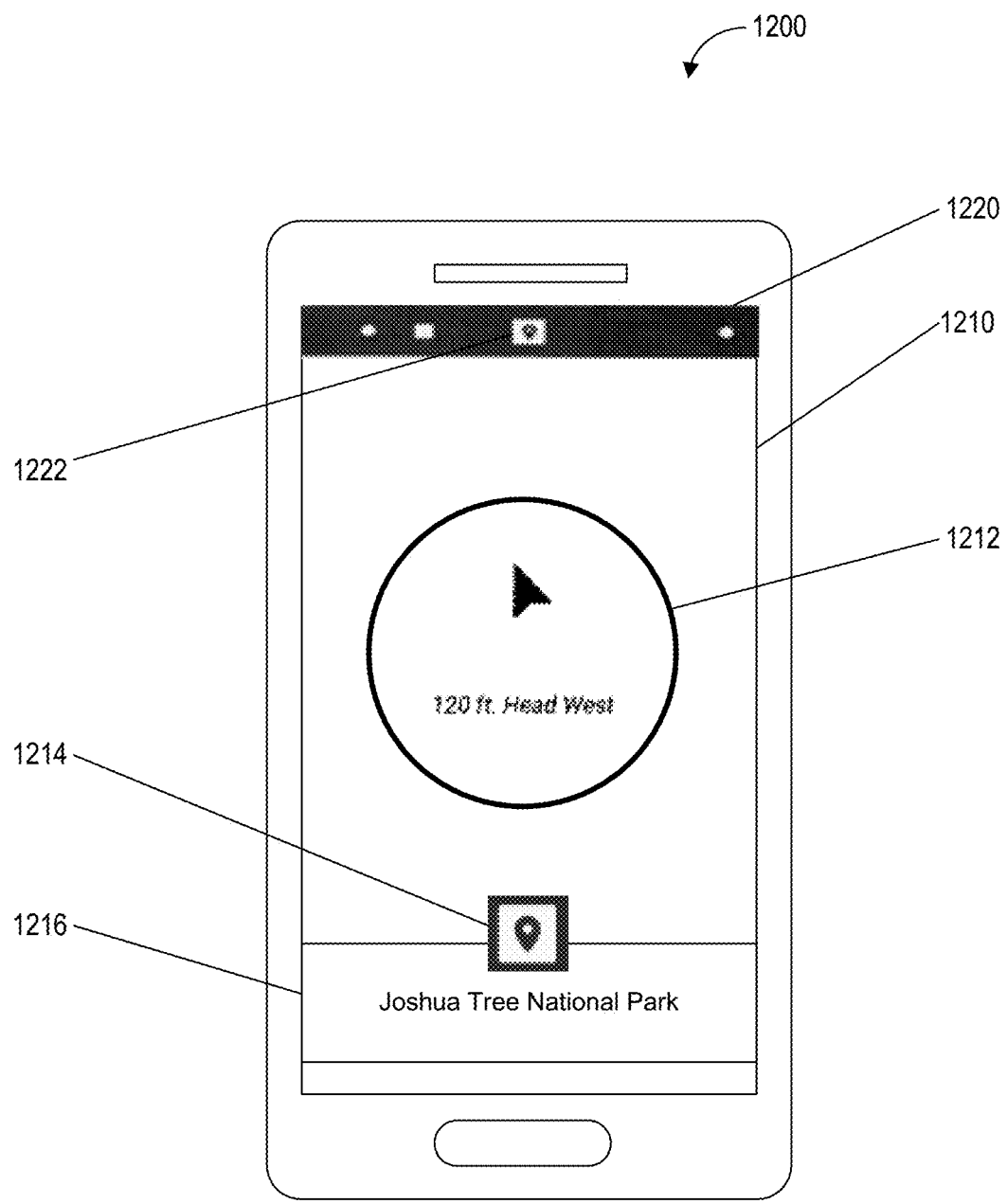
FIG. 12 depicts an example of sensor based semantic object generation including navigation according to example embodiments of the present disclosure.

FIG. 12 depicts an example of sensor based semantic object generation including navigation according to example embodiments of the present disclosure. FIG. 12 includes an illustration of a semantic processing system 1200 that can include one or more portions of one or more systems (e.g., one or more computing systems) or devices (e.g., one or more computing devices) including, the user device 102 shown in FIG. 1, the remote computing device 104 shown in FIG. 1, and/or the computing device 200 shown in FIG. 2. Further, the detection, recognition, and/or processing of one or more portions of an environment by the semantic processing system 1200 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 12, the semantic processing system 1200 includes a display component 1210, a navigation indicator 1212, a status indicator 1214, a destination indicator 1216, a status area 1220, and a status indicator 1222.

In this example, the semantic processing system 1200 includes a display component 1210 that displays one or more images and/or text. At the top of the display component 1210, a status area 1220 that can include various indicators including the status indicator 1222 to indicate that the semantic processing system 1200 is in a navigational mode. The semantic processing system 1200 can generate other indicators in various sizes, shapes, and/or colors, including the status indicator 1214 that is above the destination indicator 1216 that indicates the destination that a user of the semantic processing system 1200 is travelling to. The display component 1210 can also generate that includes text instructions "120 ft. Head West" and a graphical indicator (an arrow) that points in the direction of the destination location. The semantic processing system 1200 can also include generate the navigation indicator 1212 that includes an identifier associated with the destination location "Joshua Tree National Park" that, in some embodiments, can receive one or more inputs from a user to provide more information associated with the destination location. In some embodiments, the status indicator 1214 can change color, shape, and/or size when the destination location is arrived at.

Figure 13:
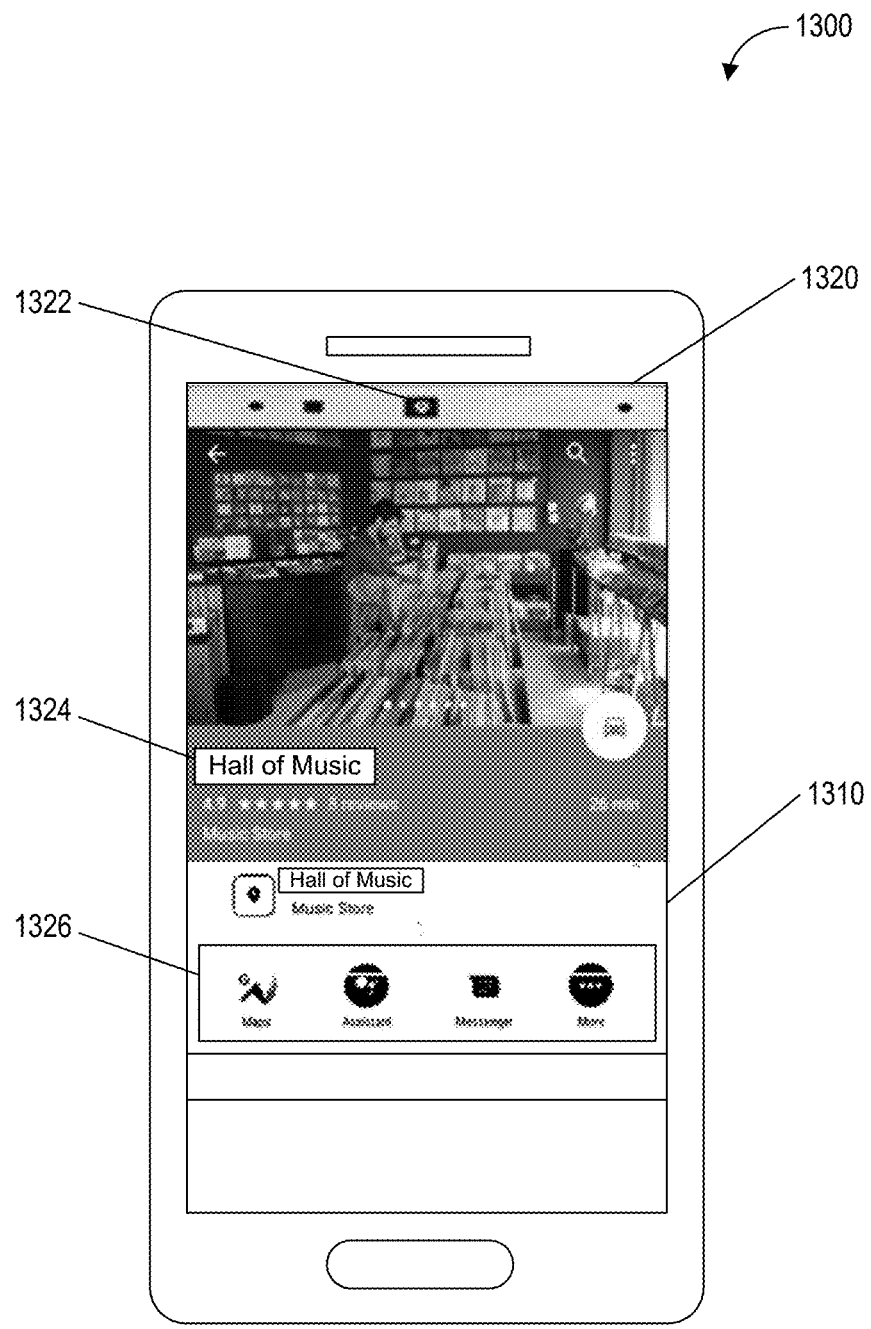
FIG. 13 depicts an example of an interface element of a sensor based semantic object generation including location identification according to example embodiments of the present disclosure.

FIG. 13 depicts an example of sensor based semantic object generation including location identification according to example embodiments of the present disclosure. FIG. 13 includes an illustration of a semantic processing system 1300 that can include one or more portions of one or more systems (e.g., one or more computing systems) or devices (e.g., one or more computing devices) including, the user device 102 shown in FIG. 1, the remote computing device 104 shown in FIG. 1, and/or the computing device 200 shown in FIG. 2. Further, the detection, recognition, and/or processing of one or more portions of an environment by the semantic processing system 1300 can be implemented as an algorithm on the hardware components of one or more devices or systems (e.g., the user device 102, the remote computing device 104, and/or the computing device 200) to, for example, generate one or more semantic objects and output based on one or more objects. As shown in FIG. 13, the semantic processing system 1300 includes a display component 1310, a status area 1320, a status indicator 1322, an interface element 1324, and an interface element 1326.

In this example, the semantic processing system 1300 includes a display component 1310 that includes a status area 1320 (e.g., a status bar) that can generate indicators of a status of the device or of semantic objects that have been generated by the semantic processing system 1300 in response to recognition of one or more states of one or more objects in an environment. The status area 1320 can include a status indicator 1322 that can indicate that the semantic processing system 1300 has performed recognition of the environment and has provided information resulted with the environment. In this example, the semantic processing system 1300 provides an interface element 1324 that includes an indication of the location of the environment ("Hall of Music") and also provides the interface element 1326 that provide a user with different ways to interact with the semantic object associated with the environment. For example, a user of the semantic processing system 1300 can touch the interface element 1326 to access information about the object (e.g., ratings of the hall of music).

Figure 14:
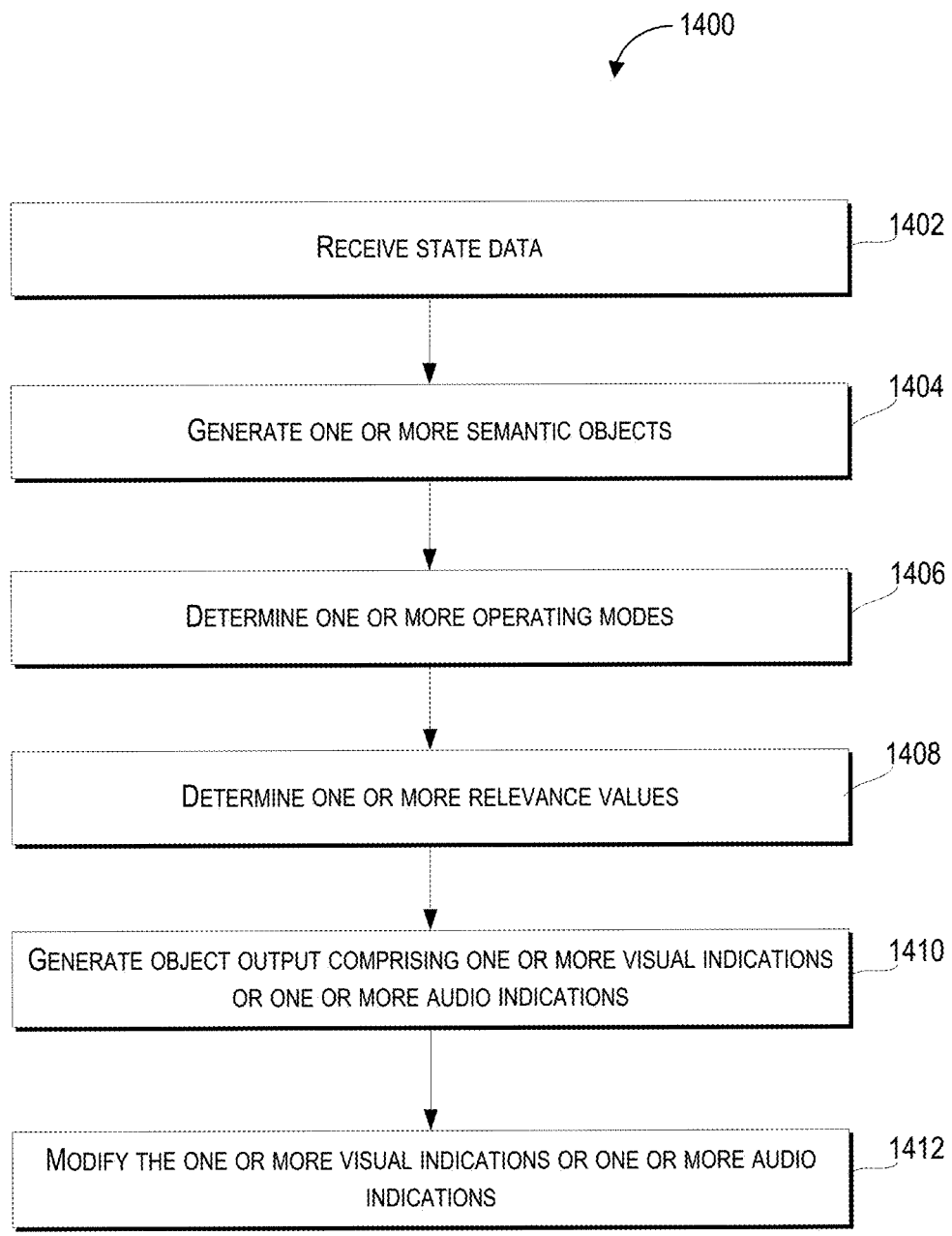
FIG. 14 depicts a flow diagram of sensor based semantic object generation according to example embodiments of the present disclosure.

FIG. 14 depicts a flow diagram of an example method of sensor based semantic object generation according to example embodiments of the present disclosure. One or more portions of the method 1400 can be executed or implemented on one or more computing devices or computing systems including, for example, the user device 102, the remote computing device 104, and/or the computing device 200. One or more portions of the method 1400 can also be executed or implemented as an algorithm on the hardware components of the devices disclosed herein. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include receiving data, including for example, state data that is based in part on sensor output from one or more sensors that detect a state of an environment including one or more objects including physical objects (e.g., entrances to buildings, street addresses, signage, and/or electronic devices).

The state data can include information associated with the state of the environment including one or more objects in the environment. The state of the environment including the one or more objects can include a temporal state (e.g., the time of day when the sensor output associated with the state of the environment was output by the one or more sensors) that can also include one or more durations of events associated with the environment (e.g., the duration of scheduled events); a location state associated with the location of the one or more objects in the environment (e.g., a latitude and longitude and/or a relative location of the one or more objects to one another or to a point of reference location); and/or a physical state including one or more physical characteristics (e.g., appearance including color and/or texture; physical dimensions including size, volume, mass, and/or weight; and/or audio characteristics).

In some embodiments, the one or more sensors can include one or more optical sensors (e.g., one or more cameras); one or more periscopic cameras including one or more cameras that have a field of view that exceeds one-hundred and eighty degrees; one or more audio sensors (e.g., one or more microphones); one or more tactile sensors (e.g., surfaces that can detect pressure or capacitance); one or more pressure sensors including barometric sensors; one or more gyroscopic sensors; one or more accelerometers including a configuration in which the one or more accelerometers can determine acceleration along any of three axes (e.g., x axis, y axis, and z axis); one or more humidity sensors including one or more sensors that can detect the level of moisture in the air; one or more electromagnetic sensors; and/or one or more thermal sensors.

In some embodiments, the semantic processing system can include a display component (e.g., a liquid crystal display (LCD), an organic light emitting diode (OLED), plasma display panel, electronic ink, and/or a cathode ray tube) that is configured to display one or more images that can include images of an environment that includes one or more objects that are detected by one or more sensors. Further, in some embodiments the display component can include the one or more sensors (e.g., a touch screen) so that the display component can be used as an input device.

Further, the one or more periscopic cameras can be configured or positioned to capture the one or more images including the one or more objects or portions of the one or more objects that are not within a visual plane of the display component. For example, the one or more periscopic cameras can be positioned on any portion of the semantic computing system including a side facing a user holding the semantic computing system (e.g., on the same side as a display component), a side facing away from a user holding the semantic computing system (e.g., a side opposite a display component), and/or any of the edges of the device.

The display component of the semantic computing system can include a visual plane which can include a plane that if it were an optical sensor would capture one or more images within a range of less than one hundred and eighty degrees of a portion of the optical sensor (e.g., images perpendicular to or behind the visual plane would not be captured). For example, if the semantic processing device is in the shape of a rectangular cuboid, the one or more periscopic cameras can be located on any of the sides of the cuboid.

At 1404, the method 1400 can include generating one or more semantic objects corresponding to the one or more objects. The one or more semantic objects can be generated, for example, based in part on data including the state data and/or an object recognition model including a machine learned model.

The semantic processing system can analyze the state data and perform one or more operations on the state data including comparing the state data to information that is associated with one or more portions of the state data. For example, the appearance of the one or more objects can be compared to a database of objects that can be used to identify the one or more objects. Based on the identification of the one or more objects, the semantic processing system can generate further information including attributes of the one or more objects. In another example, the state data can include a location and time which can be used to determine, based on a comparison to a database of events, whether one of the events in the database will occur within a given location at a time period that the user of the device will be present in the location.

In some embodiments, the semantic processing system can access a machine learned model (e.g., access a machine learned model that has been stored locally and/or a machine learned model that is stored on a remote computing device) that has been created using a classification dataset including classifier data that includes a set of classified features and a set of classified object labels associated with training data that can be based on, or associated with, a plurality of training objects (e.g., physical objects or simulated objects that are used as training inputs for the machine learned model). The classification dataset can be based in part on inputs from one or more sensors (e.g., cameras and/or microphones) that have been used to generate visual outputs and audio outputs based on the visual inputs and the audio inputs respectively. For example, the machine learned model can be created using a set of cameras and microphones that captured training data including video and audio of an urban area that includes various objects including waterbodies, waterways, buildings (e.g., houses and/or hotels), streets, alleyways, vehicles (e.g., automobiles and/or trams), people, and/or surfaces with text (e.g., movie posters).

The one or more semantic objects can include a set of attributes (e.g., a set of attributes for each of the one or more semantic objects). For example, the set of attributes associated with the one or more semantic objects can include one or more object identities including the identity of the one or more objects associated with the one or more semantic objects (e.g., the manufacturer and model of an automobile); one or more object types associated with the type, category, or class of the one or more objects associated with the one or more semantic objects (e.g., an automobile can be associated with a vehicle type); an object location including a geographic location associated with the one or more objects associated with the one or more semantic objects (e.g., an address of a building object); a monetary value (e.g., one or more prices associated with an object); an ownership status including the owner of an object (e.g., the owner of a house); and/or a set of physical characteristics (e.g., a size, appearance, and/or mass associated with an object).

At 1406, the method 1400 can include determining, based in part on the set of attributes of the one or more semantic objects, one or more operating modes associated with the one or more semantic objects. The one or more operating modes can determine the way in which the one or more semantic objects are processed and/or used by the semantic processing system. As such, the semantic processing system can selectively dedicate computing resources to a subset of possible operations based on the one or more attributes of the one or more semantic objects (e.g., detecting signage that includes text can result in a determination that a text recognition mode will be used to process the one or more semantic objects associated with the signage).

The one or more operating modes can include a text recognition mode associated with recognizing textual information in the environment (e.g., recognizing when an object contains text or pictograms); a location recognition mode associated with recognizing one or more locations in the environment (e.g., locating an entrance to a restaurant); an object recognition mode associated with recognizing the one or more objects in the environment (e.g., recognizing an automobile in a parking lot); and/or an event recognition mode associated with recognizing an occurrence of one or more events in the environment (e.g., associating a time and location with a scheduled event).

At 1408, the method 1400 can include determining one or more relevance values corresponding to the one or more semantic objects. The one or more relevance values can be based in part on an extent to which each of the one or more semantic objects is associated with context data. The context data can include various characteristics associated with the environment including data associated with a time of day, a current location (e.g., a geographical location and/or address associated with the environment); one or more scheduled events (e.g., one or more events that will occur within a predetermined period of time), one or more user locations, or one or more user preferences (e.g., one or more preferences of a user including restaurant preferences, literature preferences, and/or beverage preferences). In some embodiments, the one or more object outputs can be based in part on the one or more relevance values that correspond to the one or more semantic objects.

At 1410, the method 1400 can include generating, based in part on the one or more operating modes, one or more object outputs associated with the one or more semantic objects. The one or more object outputs can include one or more outputs via one or more output devices of the semantic processing system (e.g., one or more display devices, audio devices, and/or haptic output devices). The text recognition mode can produce one or more object outputs that include text related output including translations of text that is recognized (e.g., generating Russian text based on detection and translation of an English text).

In some embodiments, the one or more object outputs can include one or more visual indications (e.g., one or more visual images produced by a display device of the semantic processing system) and/or one or more audio indications (e.g., one or more sounds produced by an audio output device of the semantic processing system). For example, the one or more object outputs can include a translation displayed on a display device, audio indications that include an audio version of a written text (e.g., text to speech), and/or one or more images that are superimposed on camera imagery of an environment.

At 1412, the method 1400 can include modifying, based in part on the state data or the semantic data, the one or more visual indications or the one or more audio indications. Modifying the one or more visual indications or the one or more audio indications can include transforming the one or more visual indications into one or more modified audio indications (e.g., generating artificial speech based on detected text); transforming the one or more audio indications into one or more modified visual indications (e.g., generating text based on audio inputs to a microphone); modifying a size of the one or more visual indications (e.g., increasing the size of an object captured by a camera); modifying one or more color characteristics of the one or more visual indications (e.g., brightening the one or more visual indications); and/or modifying an amplitude of the one or more audio indications (e.g., increasing the volume of one or more audio indications). Such modifications of the one or more visual indications and/or the one or more audio indications can be used to enhance any user's experience and can be particularly useful for individuals with visual or hearing impairments. For example, the semantic processing system can enhance the volume of sounds that would otherwise be inaudible for an individual with a hearing impairment.

Figure 15:
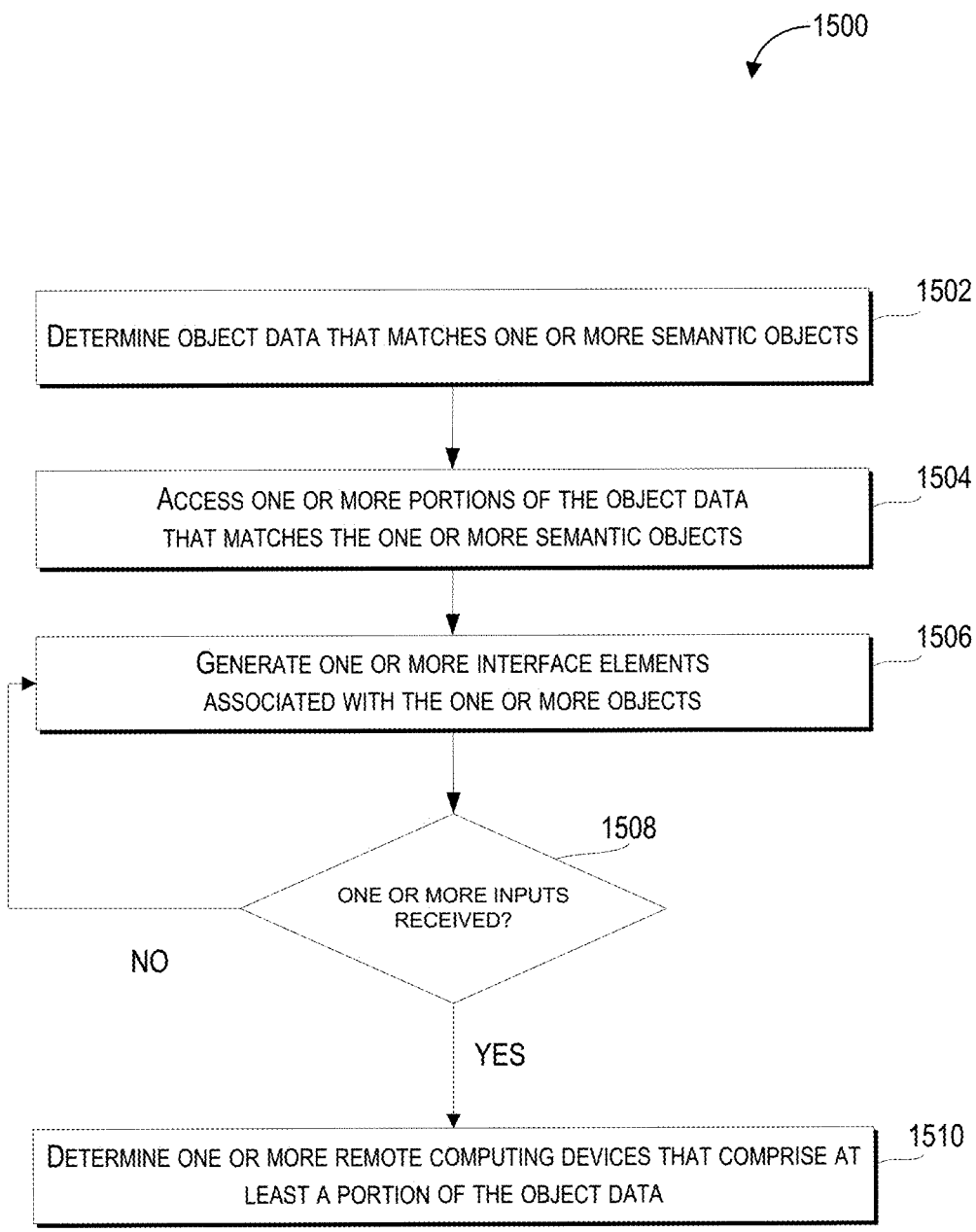
FIG. 15 depicts a flow diagram of sensor based semantic object generation according to example embodiments of the present disclosure.

FIG. 15 depicts a flow diagram of an example method of sensor based semantic object generation according to example embodiments of the present disclosure. One or more portions of the method 1500 can be executed or implemented on one or more computing devices or computing systems including, for example, the user device 102, the remote computing device 104, and/or the computing device 200. One or more portions of the method 1500 can also be executed or implemented as an algorithm on the hardware components of the devices disclosed herein. FIG. 15 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1502, the method 1500 can include determining, based in part on the set of attributes (e.g., the set of attributes in the method 1400) of the one or more semantic objects (e.g., the one or more semantic objects in the method 1400), object data that matches the one or more semantic objects. For example, the semantic processing system can match the set of attributes to the object data based on one or more comparisons between portions of the set of attributes and the object data. The object data can include information associated with one or more related objects (e.g., a semantic object for a hat can be associated with other articles of clothing); one or more remote data sources (e.g., a semantic object for a song can be associated with a website associated with the singer of the song); one or more locations; and/or one or more events.

At 1504, the method 1500 can include accessing one or more portions of the object data that matches the one or more semantic objects. For example, the semantic processing system can access one or more portions of the object data that are stored on one or more remote computing devices. In some embodiments, the one or more object outputs can be based in part on the one or more portions of the object data that matches the one or more semantic objects. For example, when the object data includes links to one or more remote computing devices that are associated with the one or more semantic objects, the one or more object outputs can include those links.

At 1506 the method 1500 can include generating, based in part on the state data or the one or more semantic objects, one or more interface elements associated with the one or more objects. The one or more interface elements can include one or more images (e.g., graphical user interface elements including still or animated pictures, pictograms, and/or text) responsive to one or more inputs (e.g., the one or more interface elements can initiate or trigger one or more operations based on a haptic input and/or an audio input). For example, the one or more interface elements can include a status indicator (e.g., a status bar displayed on a display component of the semantic processing system) that can provide one or more incremental (e.g., every minute, every hour, and/or every day) and/or continuous (e.g., real-time) indications of associated with the state of the one or more objects (e.g., the location and/or closing time of a restaurant).

In some embodiments recognition of the one or more objects can be performed as a continuous process (e.g., continuous recognition of the one or more objects) so that the one or more objects (e.g., sensor output including visual and/or audio sensor output associated with the one or more objects that) can be detected, identified, and/or recognized in real time and the one or more interface elements including the status indicator can also be updated continuously (e.g., as the one or more objects are recognized in real time). Further, the one or more interface elements can be used to provide navigational instructions (e.g., textual or audio instructions associated with a path to a location) and other information related to the one or more objects in the environment.

At 1508, the method 1500 can include determining whether, when, or that, one or more inputs are received by the semantic processing system. The one or more inputs can include one or more inputs from a user of the semantic processing system including one or more visual inputs (e.g., waving a hand or blinking in front of a camera of the semantic processing system); one or more audio inputs (e.g., speaking a command into a microphone of the semantic processing system); and/or one or more haptic inputs (e.g., touching a portion of a display component of the semantic processing system). Further, the one or more inputs can include one or more inputs to a device associated with the semantic processing system including a computing device and/or an input device (e.g., a stylus and/or a mouse).

In response to receiving the one or more inputs, the method 1500 proceeds to 1510. In response to not receiving the one or more inputs, the method can end or return to a previous part of the method 1500 including 1502, 1504, or 1506.

At 1510, the method 1500 can include, in response to receiving one or more inputs to the one or more interface elements, determining one or more remote computing devices that include at least a portion of the object data (e.g., one or more remote computing devices that store some part of the object data). The one or more object outputs can include one or more remote source indications associated with the one or more remote computing devices that comprise at least a portion of the object data (e.g., IP addresses associated with the one or more remote computing devices).

Figure 16:
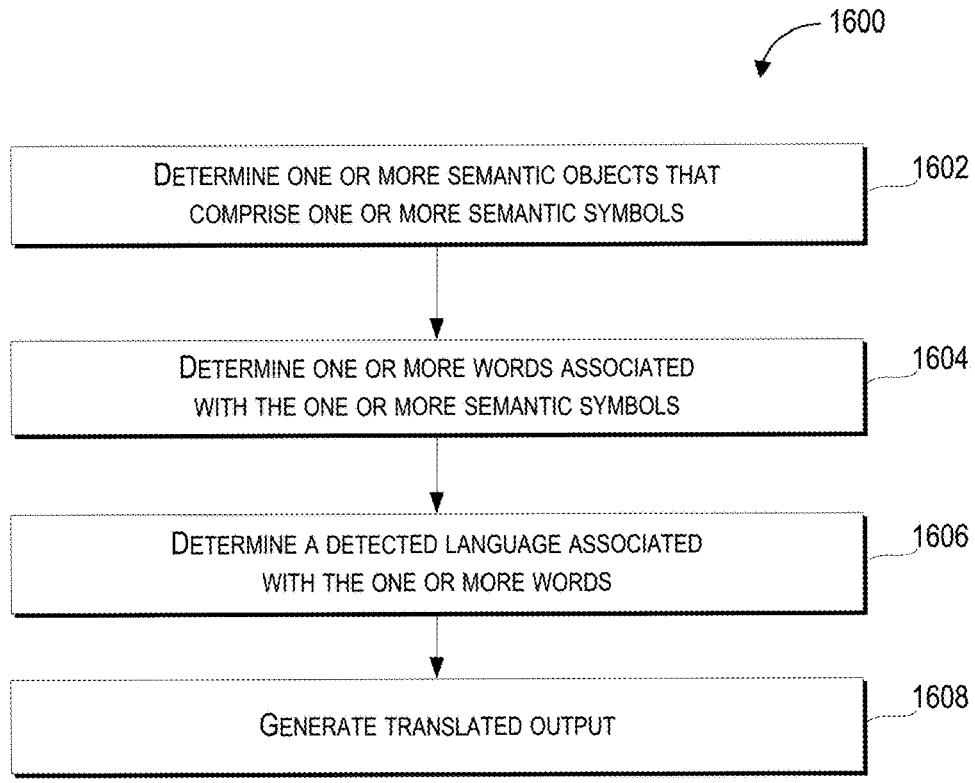
FIG. 16 depicts a flow diagram of sensor based semantic object generation according to example embodiments of the present disclosure.

FIG. 16 depicts a flow diagram of an example method of sensor based semantic object generation according to example embodiments of the present disclosure. One or more portions of the method 1600 can be executed or implemented on one or more computing devices or computing systems including, for example, the user device 102, the remote computing device 104, and/or the computing device 200. One or more portions of the method 1600 can also be executed or implemented as an algorithm on the hardware components of the devices disclosed herein. FIG. 16 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1602, the method 1600 can include determining, based in part on the state data (e.g., the state data in the method 1400) or the one or more semantic objects (e.g., the one or more semantic objects in the method 1400), the one or more objects (e.g., the one or more objects in the method 1400) that comprise one or more semantic symbols (e.g., one or more graphemes including one or more letters, one or more logograms, one or more syllabic characters and/or one or more pictograms).

At 1604, the method 1600 can include determining, based in part on the one or more semantic symbols, one or more words associated with the one or more semantic symbols (e.g., using a list of words, certain combinations of the one or more semantic symbols can be associated with words). In some embodiments, the set of attributes (e.g., the set of attributes in the method 1400) of the one or more semantic objects can include the one or more words. For example, the semantic object for a poster with text indicating "Winter palace restaurant grand opening on August 24" can include a poster semantic object that includes a set of attributes that includes restaurant opening as the value for an event type attribute, August 24 as the value for an event date attribute, and a geographic coordinate associated with the Winter palace restaurant, as the value for the location attribute.

At 1606, the method 1600 can include determining a detected language that is associated with the one or more semantic symbols. For example, based in part on the combinations of the one or more semantic symbols (e.g., words associated with the one or more semantic symbols), the semantic processing system can determine the language (e.g., a language including Spanish, English, Russian, and/or Japanese) that is associated with the one or more semantic symbols.

At 1608, the method 1600 can include generating, based in part on translation data, a translated output when the detected language is not associated with a default language (e.g., a language that a user of the semantic processing system has selected as being the language into which the detected language is translated when the detected language is not the same as the default language). The translation data can include one or more semantic symbols in the default language and one or more semantic symbols in the detected language. The semantic processing system can compare the one or more semantic symbols in the detected language to the one or more semantic symbols in the default language to determine and perform an analysis to translate the detected language.

The translated output can include the one or more semantic symbols in the default language that correspond to a portion of the one or more semantic symbols in the detected language (e.g., a multi-language dictionary that includes a listing of one or more words in the default language, each of which is associated with the corresponding word in the detected language). In some embodiments, the one or more object outputs can be based in part on the translated output (e.g., the one or more object outputs can include a visual indication or an audio indication of the translation).

Figure 17:
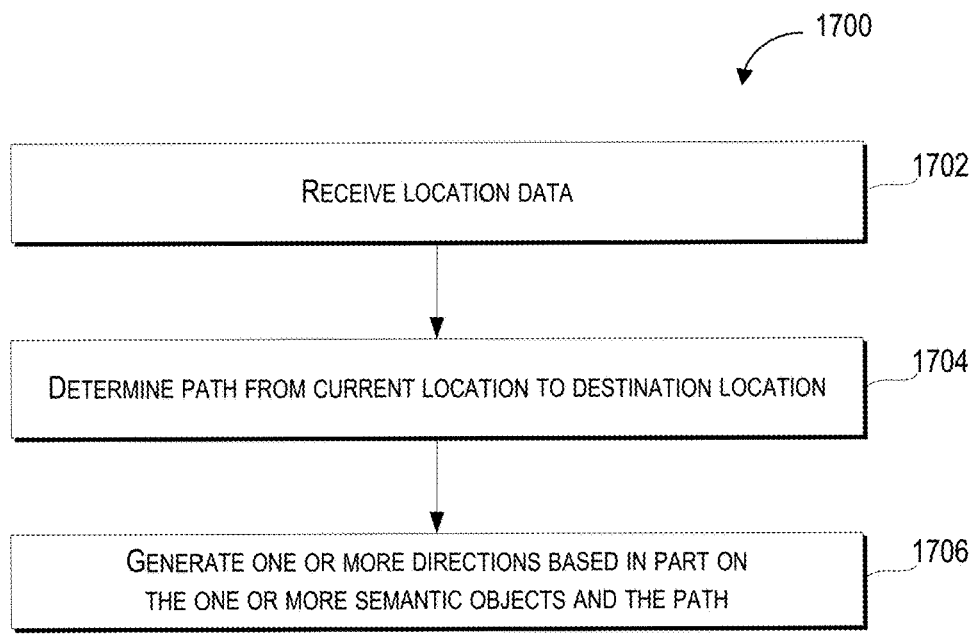
FIG. 17 depicts a flow diagram of sensor based semantic object generation according to example embodiments of the present disclosure.

FIG. 17 depicts a flow diagram of an example method of sensor based semantic object generation according to example embodiments of the present disclosure. One or more portions of the method 1700 can be executed or implemented on one or more computing devices or computing systems including, for example, the user device 102, the remote computing device 104, and/or the computing device 200. One or more portions of the method 1700 can also be executed or implemented as an algorithm on the hardware components of the devices disclosed herein. FIG. 17 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1702, the method 1700 can include receiving data, including location data that includes information associated with a current location of the environment (e.g., a latitude and longitude of the current location) and a destination location (e.g., a destination location including an address and/or a latitude and latitude selected by a user of the semantic processing system). In some embodiments, the location data can include a relative location (e.g., the current location is south-west of a user's place of business).

At 1704, the method 1700 can include determining, based in part on the location data and the state of one or more objects (e.g., the one or more objects in the method 1400) within a field of view of the one or more sensors, a path from the current location to the destination location (e.g., a path between the current location and the destination location that avoids intervening obstacles). For example, the semantic processing system can determine a shortest path from the current location to the destination location that does not go through any obstacles (e.g., a river or construction zone).

At 1706, the method 1700 can include generating one or more directions (e.g., a series of steps based on locations along the path or one or more general directions to travel in a compass direction for a period of time) based in part on the one or more semantic objects and the path from the current location to the destination location. Further, the semantic processing system can determine one or more semantic objects that can be used as landmarks associated with the one or more directions (e.g., a semantic object associated with a restaurant can be used as part of the one or more directions "turn left at the Winter palace restaurant one block ahead"). In some embodiments, the one or more object outputs can be based in part on the one or more directions (e.g., the one or more visual indications or the one or more audio indications can include directions).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for generating contextually-relevant actions, the method comprising:
   providing, by a computing device, imagery or text for display within a first user interface, wherein the imagery is generated based on data captured by a camera integrated into the computing device;
   recognizing, by the computing device, one or more semantic objects within the imagery or text displayed within the first user interface, wherein a respective semantic object in the one or more semantic objects has one or more attributes;
   in response to recognition of the respective semantic objects object within the imagery or text displayed within the first user interface:
      determining, by the computing device, an object type for the respective semantic object within the imagery display in the first user interface based on one or more attributes associated with the respective semantic object;
      selecting, by the computing device, an interface element associated with the respective semantic object within the imagery display in the first user interface based on an object type;
      providing, by the computing device, the interface element for display within a status bar, the status bar being visually separated from the first user interface;
      receiving, by the computing device, a user interaction with the interface element within the status bar; and
      in response to receipt of the user interaction with the interface element within the status bar: performing, by the computing device, an action related to the semantic object.

2. The computer-implemented method of claim 1, wherein:
   providing, by the computing device, the imagery or text for display within the first user interface comprises providing imagery for display within the first user interface; and
   recognizing, by the computing device, the one or more semantic objects within the imagery or text displayed within the first user interface comprises recognizing, by the computing device, the one or more semantic objects within the imagery displayed within the first user interface.

3. The computer-implemented method of claim 1, wherein:
   providing, by the computing device, the imagery or text for display within the first user interface comprises providing text for display within the first user interface; and
   recognizing, by the computing device, the one or more semantic objects within the imagery or text displayed within the first user interface comprises recognizing, by the computing device, the one or more semantic objects within the text displayed within the first user interface.

4. The computer-implemented method of claim 1, wherein:
performing, by the computing device, the action related to the semantic object comprises providing an opportunity to purchase an item related to the semantic object.

5. The computer-implemented method of claim 1, wherein:
performing, by the computing device, the action related to the semantic object comprises providing additional information about the semantic object.

6. The computer-implemented method of claim 1, wherein said recognizing is performed in a background thread separate from said providing of the imagery or text for display within the first user interface.

7. The computer-implemented method of claim 1, wherein recognizing, by the computing device, the one or more semantic objects within the imagery or text displayed within the first user interface comprises processing, by the computing device, the imagery or text displayed within the first user interface with a machine-learned model to recognize the one or more semantic objects within the imagery or text.

8. The computer-implemented method of claim 1, wherein the one ore more semantic objects are recognized in real-time.

9. The computer-implemented method of claim 1, wherein the status bar comprises a horizontally-oriented bar.

10. The computer-implemented method of claim 1, wherein providing, by the computing device, the interface element for display within the status bar comprises providing, by the computing device, the interface element to provide a continuous indication of a status of the one or more semantic objects.

11. A computing device for generating contextually-relevant actions, the computing device comprising one or more processors and a memory that stores instructions that, when executed by the one or more processors, cause the computing device to perform operations, the operations comprising:
providing, by the computing device, imagery or text for display within a first user interface, wherein the imagery is generated based on data captured by a camera integrated into the computing device;
recognizing, by the computing device, one or more semantic objects within the imagery or text displayed within the first user interface, wherein a respective semantic object in the one or more semantic objects has one or more attributes;
in response to recognition of the respective semantic object within the imagery or text displayed within the first user interface:
determining an object type for the respective semantic object within the imagery display in the first user interface based on one or more attributes associated with the respective semantic object;
selecting an interface element associated with the respective semantic object within the imagery display in the first user interface based on an object type;
providing, by the computing device, an interface element for display within a status bar, the status bar being visually separated from the first user interface;
receiving, by the computing device, a user interaction with the interface element within the status bar; and
in response to receipt of the user interaction with the interface element within the status bar: performing, by the computing device, an action related to the semantic object.

12. The computing device of claim 11, wherein:
providing, by the computing device, the imagery or text for display within the first user interface comprises providing imagery for display within the first user interface; and
recognizing, by the computing device, the one or more semantic objects within the imagery or text displayed within the first user interface comprises recognizing, by the computing device, the one or more semantic objects within the imagery displayed within the first user interface.

13. The computing device of claim 11, wherein:
providing, by the computing device, the imagery or text for display within the first user interface comprises providing text for display within the first user interface; and
recognizing, by the computing device, the one or more semantic objects within the imagery or text displayed within the first user interface comprises recognizing, by the computing device, the one or more semantic objects within the text displayed within the first user interface.

14. The computing device of claim 11, wherein:
performing, by the computing device, the action related to the semantic object comprises providing an opportunity to purchase an item related to the semantic object.

15. The computing device of claim 11, wherein:
performing, by the computing device, the action related to the semantic object comprises providing additional information about the semantic object.

16. The computing device of claim 11, wherein said recognizing is performed in a background thread separate from said providing of the imagery or text for display within the first user interface.

17. The computing device of claim 11, wherein recognizing, by the computing device, the one or more semantic objects within the imagery or text displayed within the first user interface comprises processing, by the computing device, the imagery or text displayed within the first user interface with a machine-learned model to recognize the one or more semantic objects within the imagery or text.

18. The computing device of claim 11, wherein the one ore more semantic objects are recognized in real-time.

19. The computing device of claim 11, wherein the status bar comprises a horizontally-oriented bar.

20. The computing device of claim 11, wherein providing, by the computing device, the interface element for display within the status bar comprises providing, by the computing device, the interface element to provide a continuous indication of a status of the one or more semantic objects.

* * * * *